US008123311B2

(12) United States Patent
Nilsson

(10) Patent No.: US 8,123,311 B2
(45) Date of Patent: Feb. 28, 2012

(54) PORTABLE DISPLAY SYSTEM AND ASSOCIATED METHODS

(76) Inventor: Robert Nilsson, Sebastian, FL (US)

( * ) Notice: Subject to any disclaimer, the term of this patent is extended or adjusted under 35 U.S.C. 154(b) by 915 days.

(21) Appl. No.: 12/108,137

(22) Filed: Apr. 23, 2008

(65) Prior Publication Data

US 2009/0267463 A1 Oct. 29, 2009

(51) Int. Cl.
*A47B 87/00* (2006.01)
(52) U.S. Cl. .................................. 312/108; 312/257.1
(58) Field of Classification Search .............. 312/107, 312/108, 111, 263, 261, 265.5, 140, 257.1; 403/348, 349, 353
See application file for complete search history.

(56) References Cited

U.S. PATENT DOCUMENTS

| | | | | |
|---|---|---|---|---|
| 1,432,044 A | * | 10/1922 | Vincent | 312/107 |
| 1,828,088 A | * | 10/1931 | Robinson | 220/683 |
| 2,669,499 A | * | 2/1954 | Vanderplank | 312/322 |
| 2,765,886 A | * | 10/1956 | Gross et al. | 312/140 |
| 2,937,416 A | * | 5/1960 | Hiers | 49/413 |
| 3,434,769 A | | 3/1969 | Salet | |
| 3,754,805 A | * | 8/1973 | Pangburn et al. | 312/111 |
| 3,890,022 A | * | 6/1975 | Moon | 312/140 |
| 3,945,744 A | * | 3/1976 | Metz | 403/317 |
| 4,036,371 A | * | 7/1977 | Michel | 211/182 |
| 4,148,535 A | * | 4/1979 | Fenwick | 312/304 |
| 4,832,421 A | * | 5/1989 | Shoffner | 312/263 |
| 4,884,420 A | * | 12/1989 | Finkel et al. | 70/58 |
| 5,125,205 A | | 6/1992 | Wichman | |
| 5,211,288 A | * | 5/1993 | Beall | 206/577 |
| 5,259,669 A | | 11/1993 | Leach et al. | |
| 5,269,112 A | | 12/1993 | Weinrub et al. | |
| 5,529,199 A | * | 6/1996 | Foster | 220/4.28 |
| 5,664,854 A | | 9/1997 | Letch | |
| 5,826,397 A | | 10/1998 | Armold | |
| 5,851,095 A | * | 12/1998 | Ellis et al. | 411/353 |
| 5,921,646 A | * | 7/1999 | Hwang | 312/263 |

(Continued)

FOREIGN PATENT DOCUMENTS

GB 2 184 281 A 6/1987

(Continued)

*Primary Examiner* — Darnell Jayne
*Assistant Examiner* — Hiwot Tefera
(74) *Attorney, Agent, or Firm* — Mark R. Malek, Esq.; G. Philip J. Zies, Esq.; Zies Widerman & Malek

(57) ABSTRACT

A portable display system includes a display unit and a carrying case. The display unit includes a base, a plurality of posts, a top, a plurality of base fasteners, a plurality of post fasteners, a front panel, side panels and rear panels. The base has a top, a bottom, a rear, sides extending outwardly from the rear, a curved front opposite the rear, a plurality of passageways formed therein, and door receiving recesses formed in the top and extending laterally adjacent the rear. The plurality of posts engage the base to extend upwardly therefrom. The top engages the plurality of posts and preferably has a top, a bottom, a rear, sides extending outwardly from the rear, a curved front, a plurality of passageways formed therein, and door receiving recesses formed in the bottom and extending laterally adjacent the rear. The plurality of base fasteners extend through the passageways formed in the base to fasten the plurality of posts to the base, and the plurality of top fasteners extend through the passageways formed in the top to fasten the top to the posts. The plurality of top fasteners each includes a top, a locking member and a threaded post engagement member.

8 Claims, 25 Drawing Sheets

U.S. PATENT DOCUMENTS

| | | | |
|---|---|---|---|
| 5,964,360 A * | 10/1999 | Hwang | 211/186 |
| 5,970,675 A | 10/1999 | Schray | |
| 6,120,116 A * | 9/2000 | Phillips | 312/223.2 |
| 6,166,910 A * | 12/2000 | Ronberg et al. | 361/724 |
| 6,270,283 B1 * | 8/2001 | Turati | 403/217 |
| 6,379,076 B1 * | 4/2002 | Reinhold et al. | 403/348 |
| 6,550,880 B2 * | 4/2003 | Reuter | 312/265.3 |
| 6,566,614 B1 * | 5/2003 | Fluckiger et al. | 177/180 |
| 6,626,119 B2 | 9/2003 | Wilton | |
| 6,764,144 B2 * | 7/2004 | Insalaco et al. | 312/108 |
| 6,939,075 B2 * | 9/2005 | Walz | 403/231 |
| 6,986,230 B2 | 1/2006 | Schipani et al. | |
| 7,386,960 B2 * | 6/2008 | Molteni | 52/238.1 |
| 7,401,394 B1 * | 7/2008 | Muller | 29/432.1 |
| 7,431,409 B2 * | 10/2008 | Yang | 312/265.5 |
| 7,467,721 B2 * | 12/2008 | Choi | 211/189 |
| 7,578,633 B2 * | 8/2009 | Walz | 403/350 |
| 7,682,100 B2 * | 3/2010 | Duval | 403/328 |
| 2002/0108542 A1 | 8/2002 | Wilton | |
| 2003/0034718 A1 * | 2/2003 | Swenson | 312/326 |
| 2007/0125735 A1 * | 6/2007 | Choi | 211/186 |
| 2008/0156759 A1 * | 7/2008 | Lai | 211/187 |
| 2010/0215428 A1 * | 8/2010 | Trice | 403/359.5 |

FOREIGN PATENT DOCUMENTS

| | | |
|---|---|---|
| GB | 2 335 944 | 6/1999 |
| WO | WO 9303242 | 2/1993 |
| WO | WO 9321798 | 11/1993 |

* cited by examiner

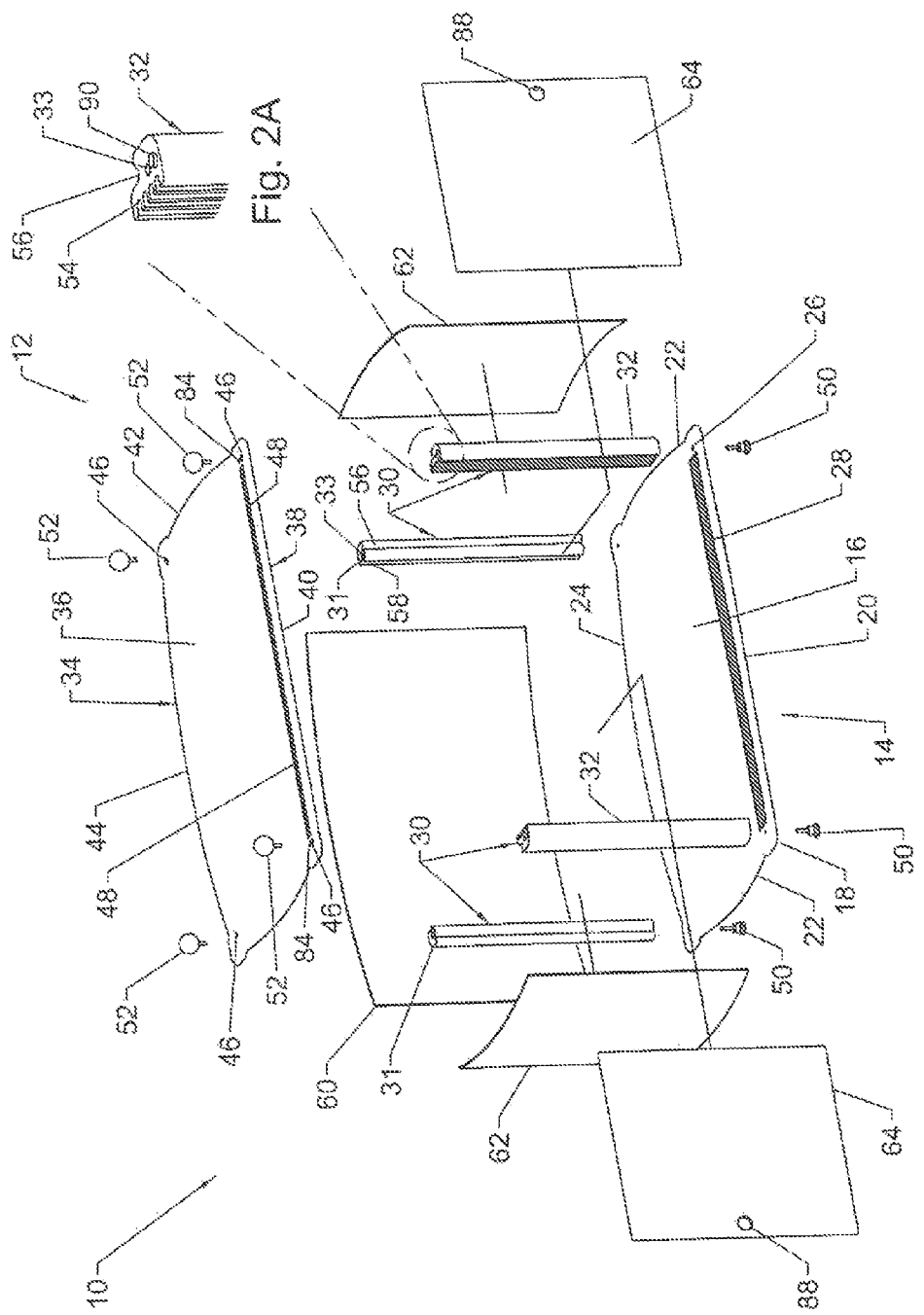

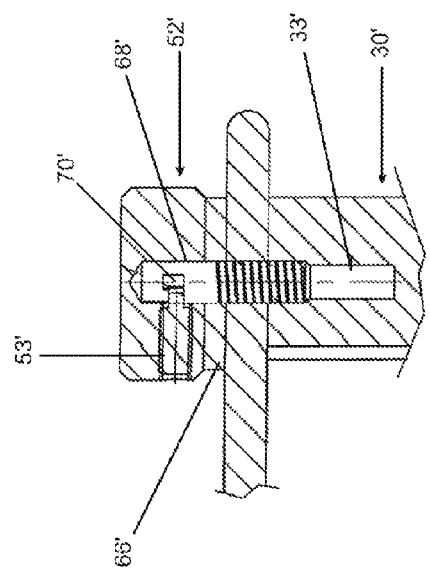
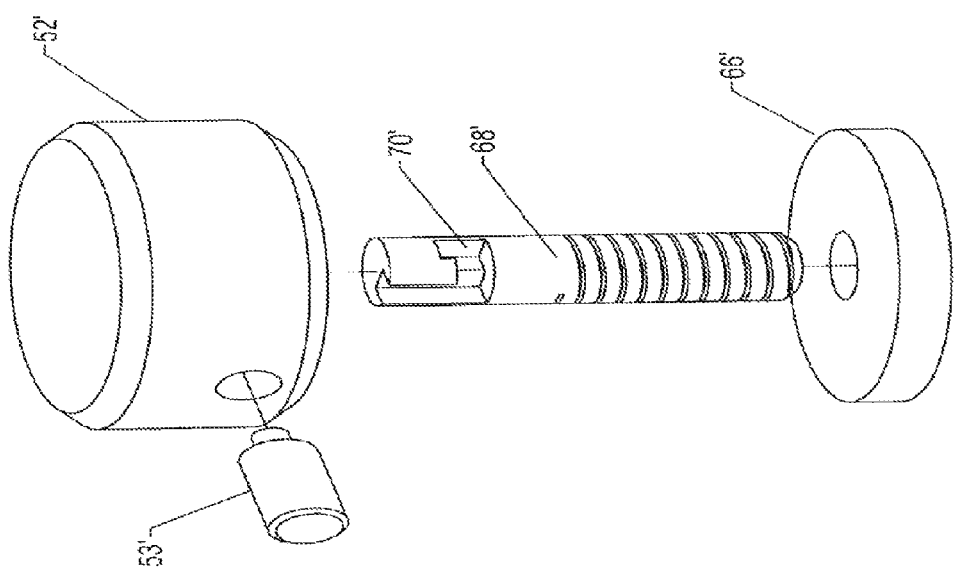
Fig. 4
Fig. 3

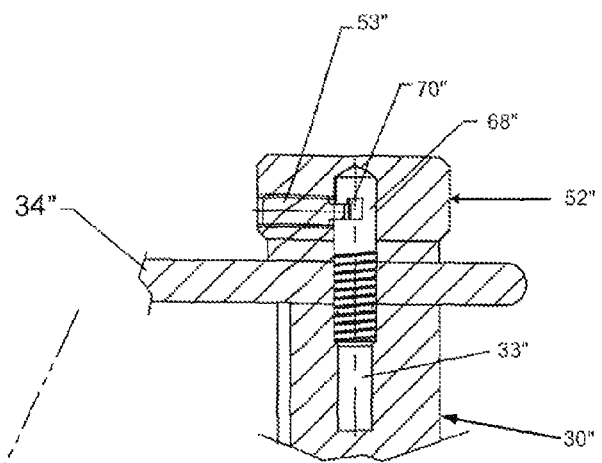
Fig 9
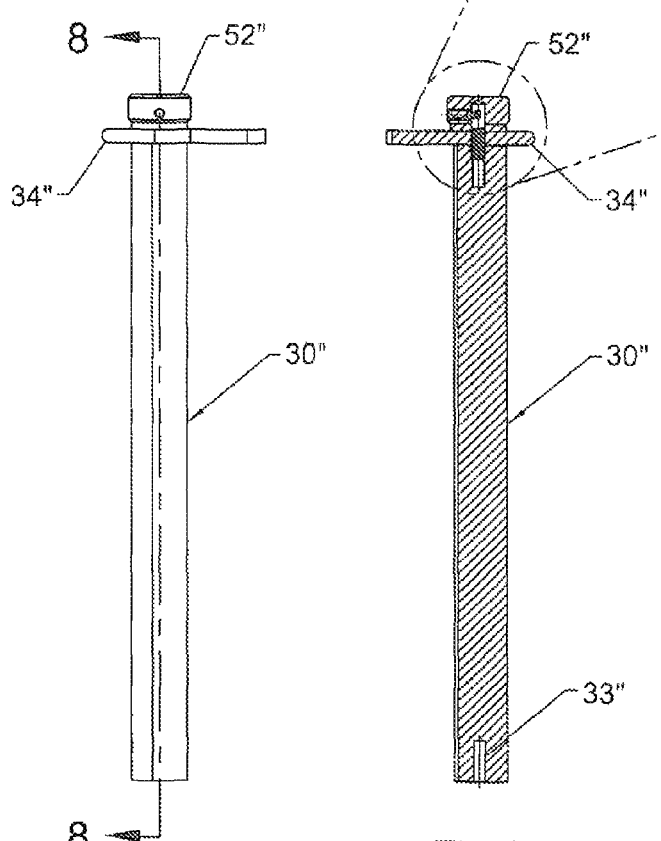
Fig 8
Fig 7

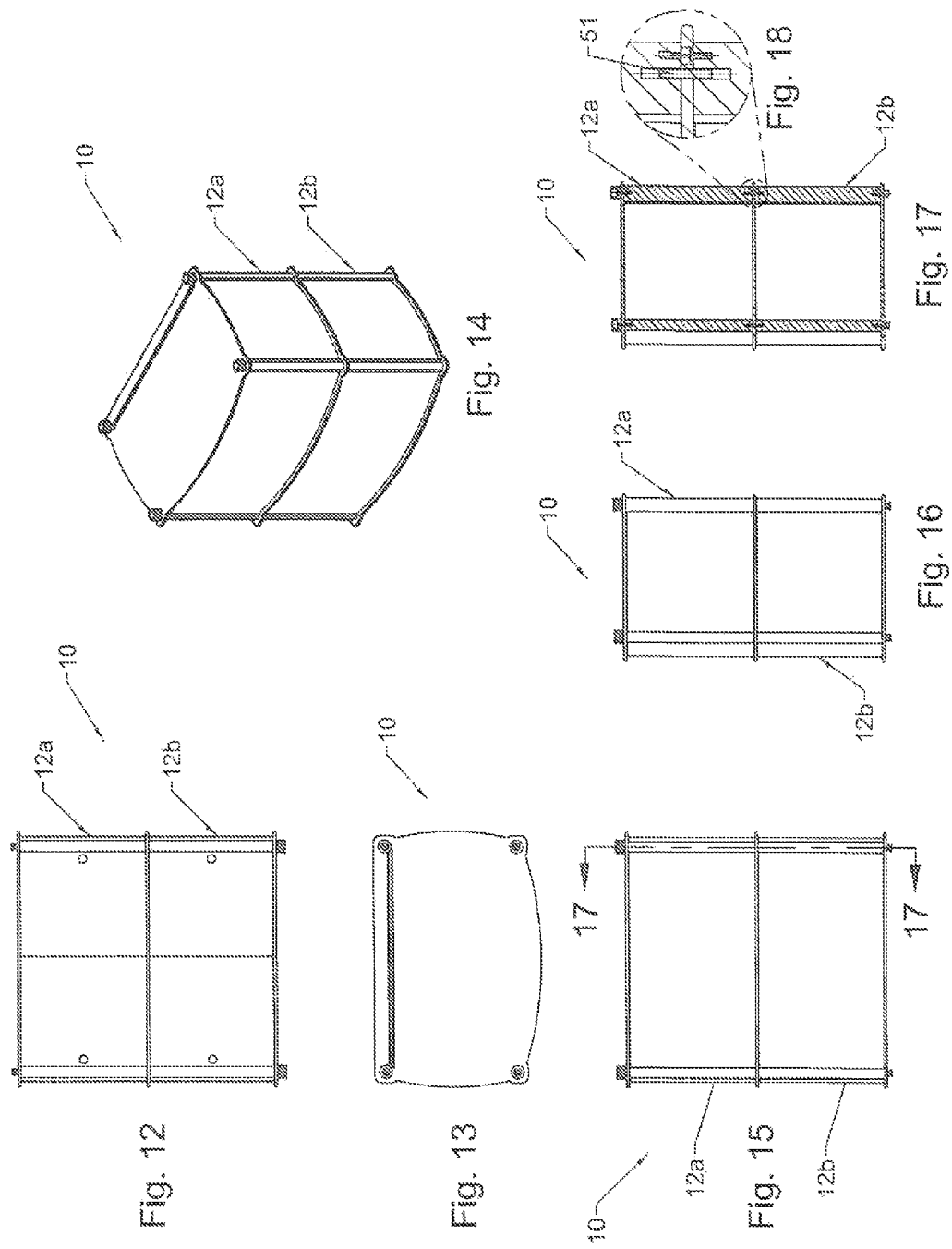

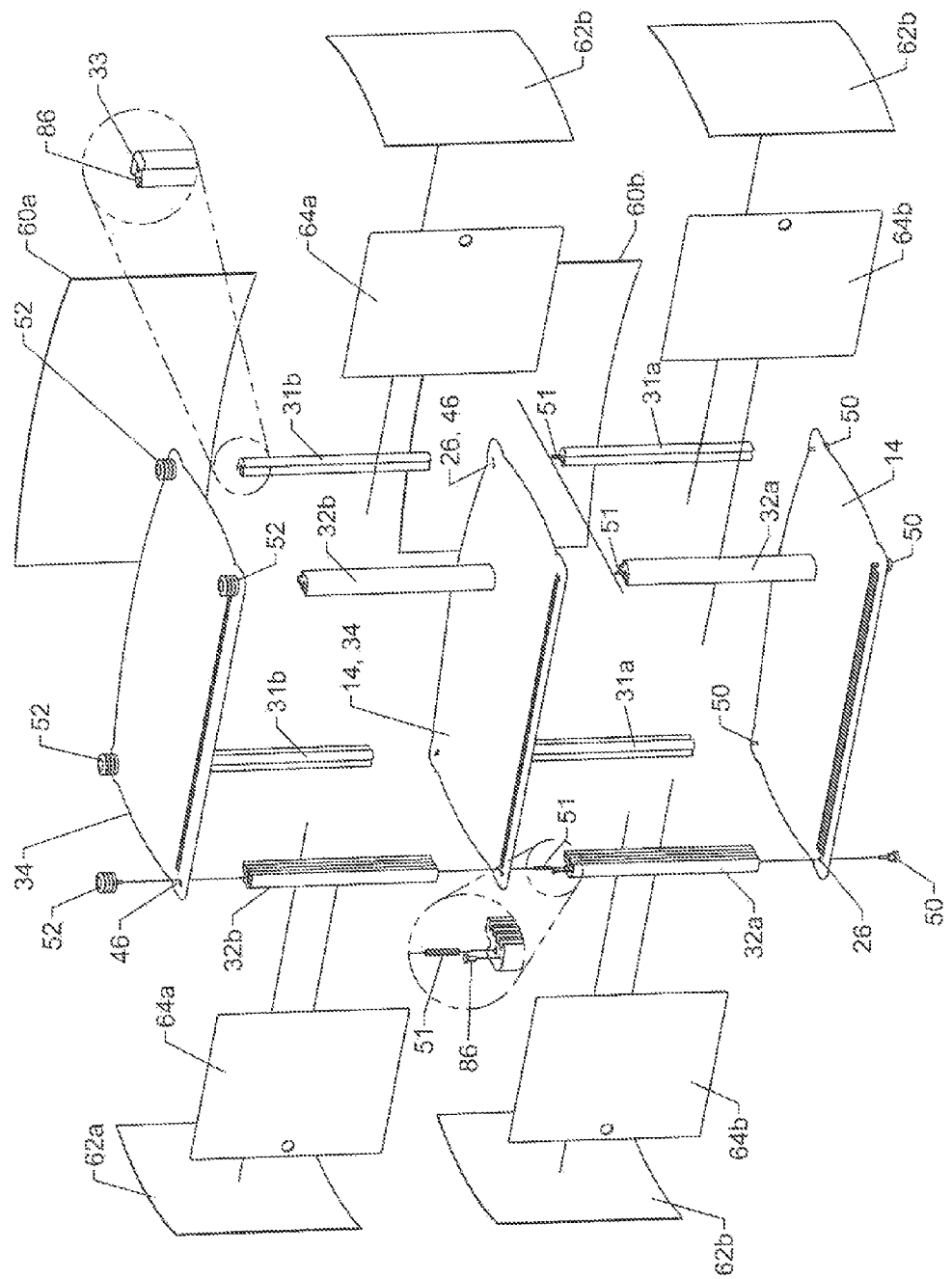

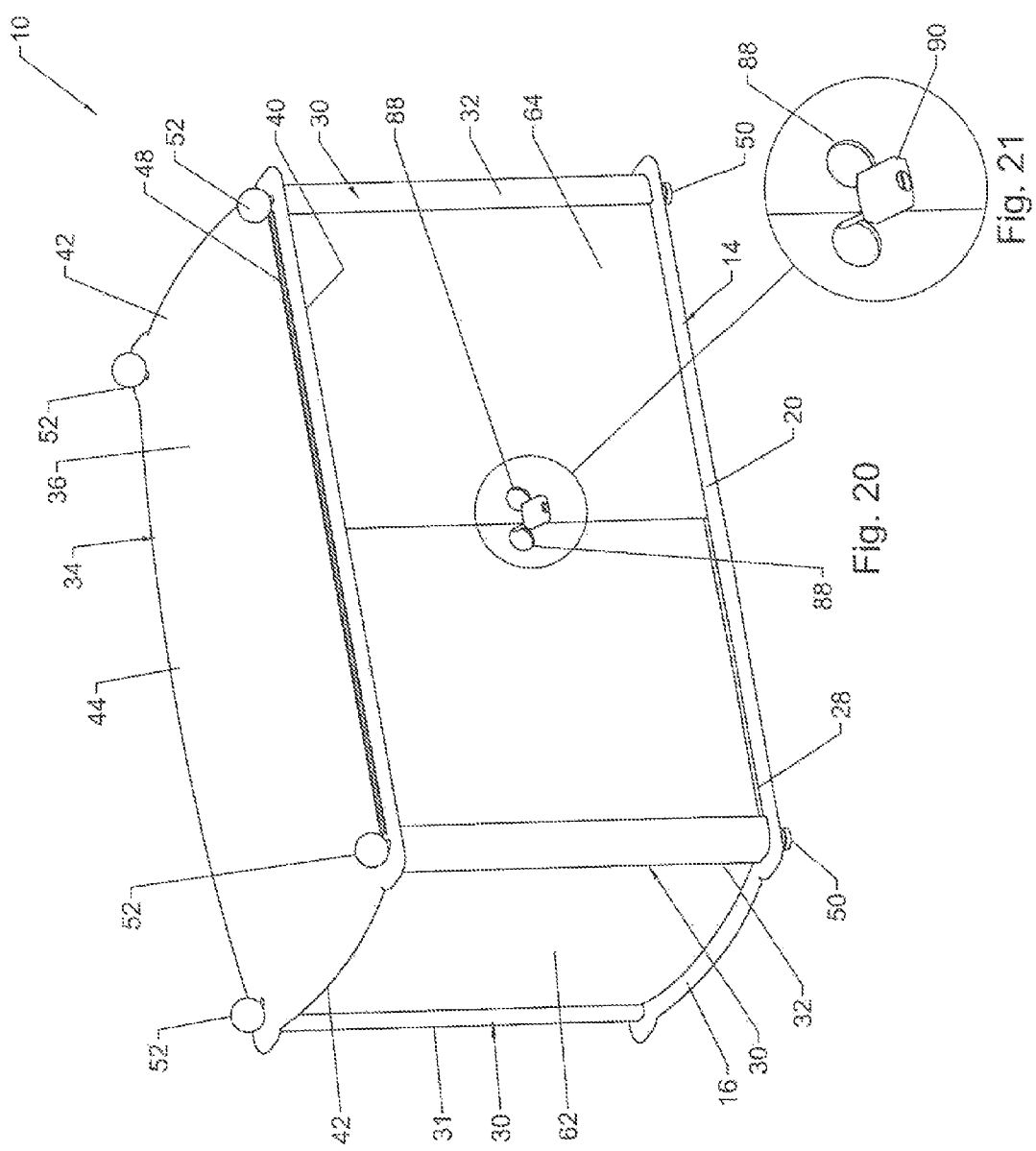

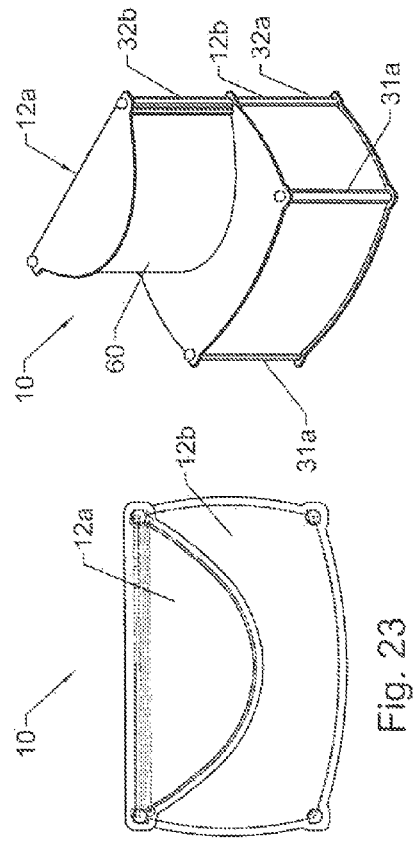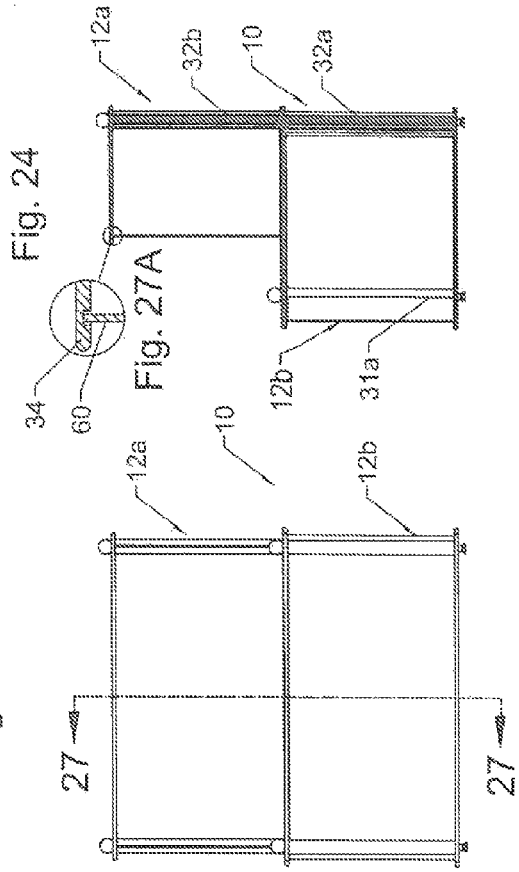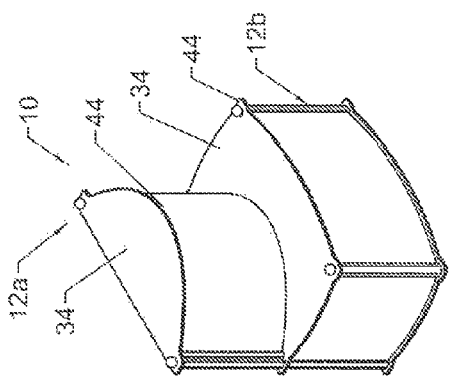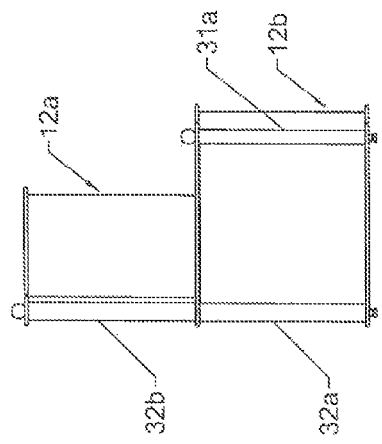

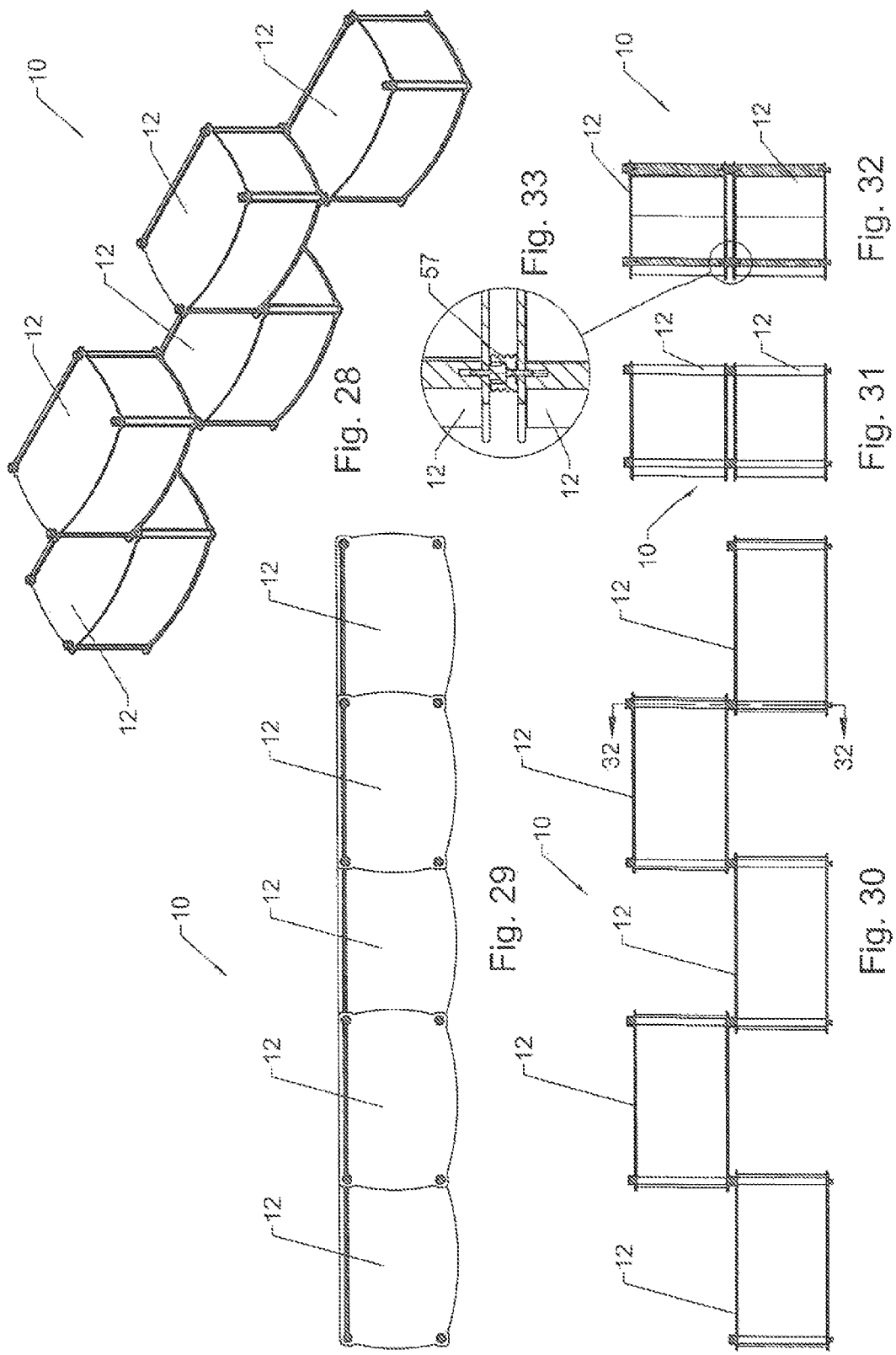

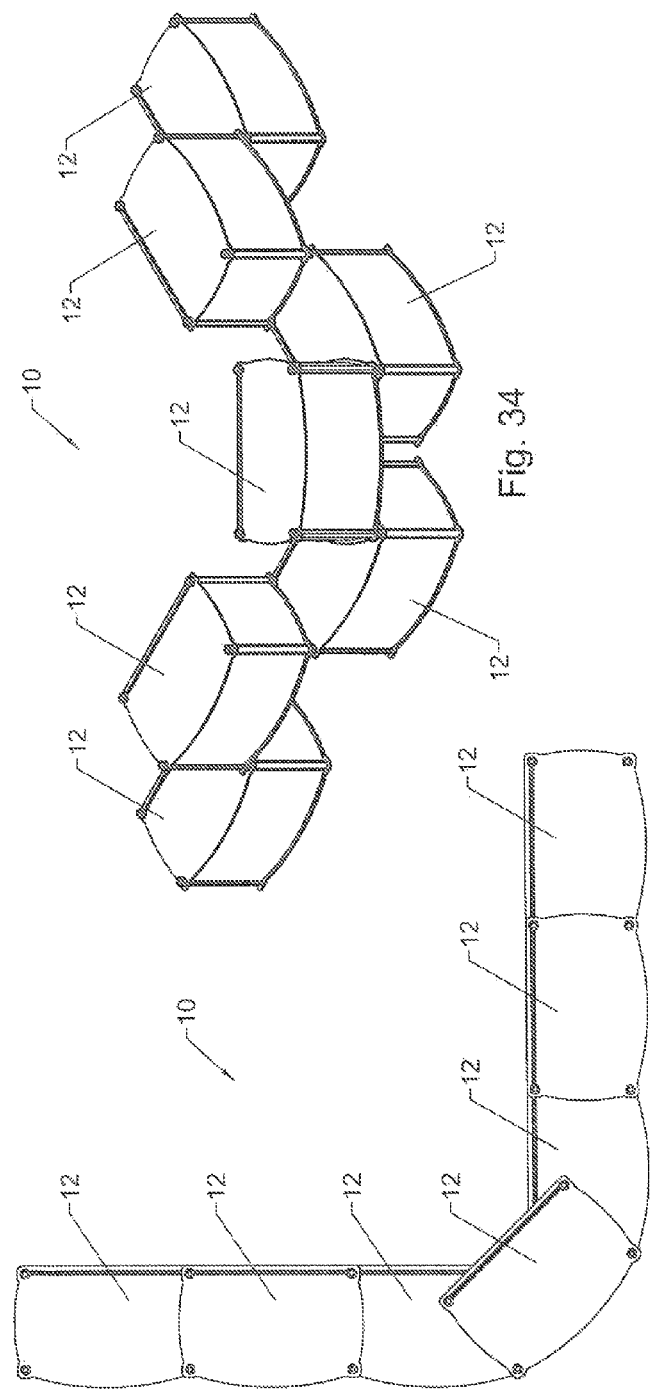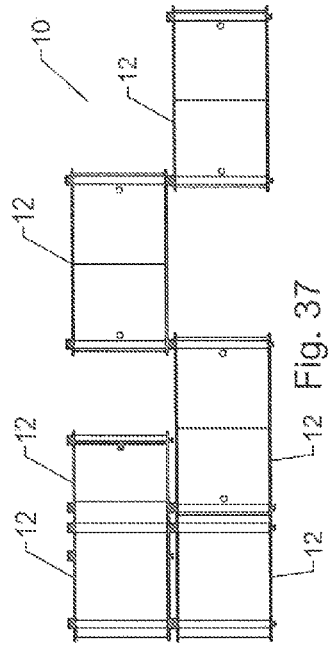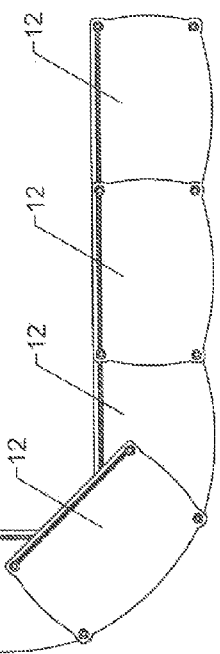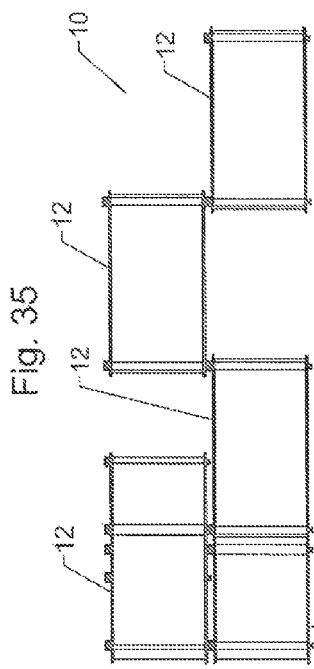

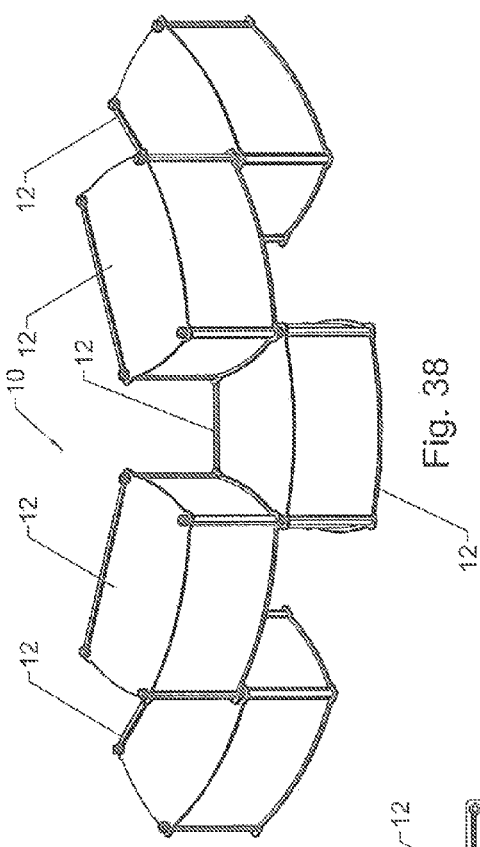
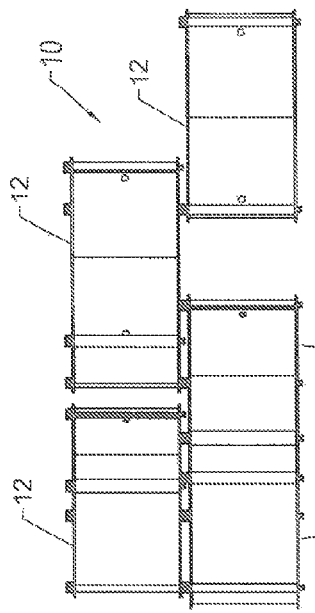
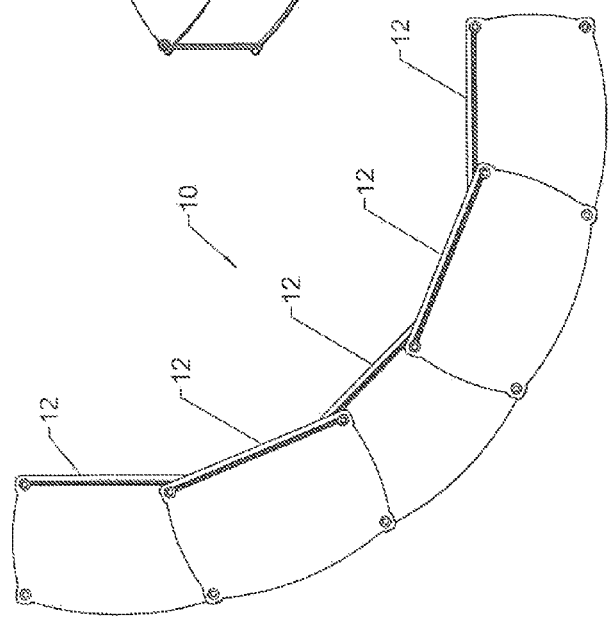
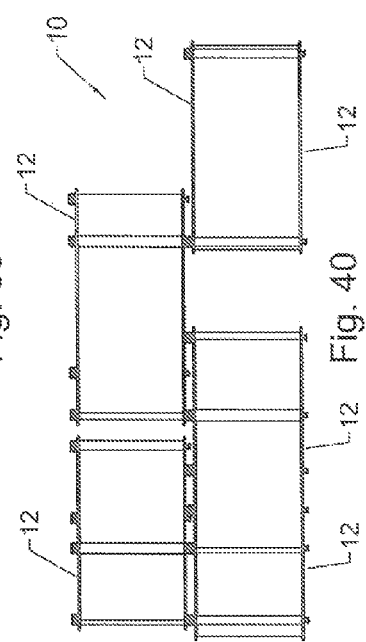

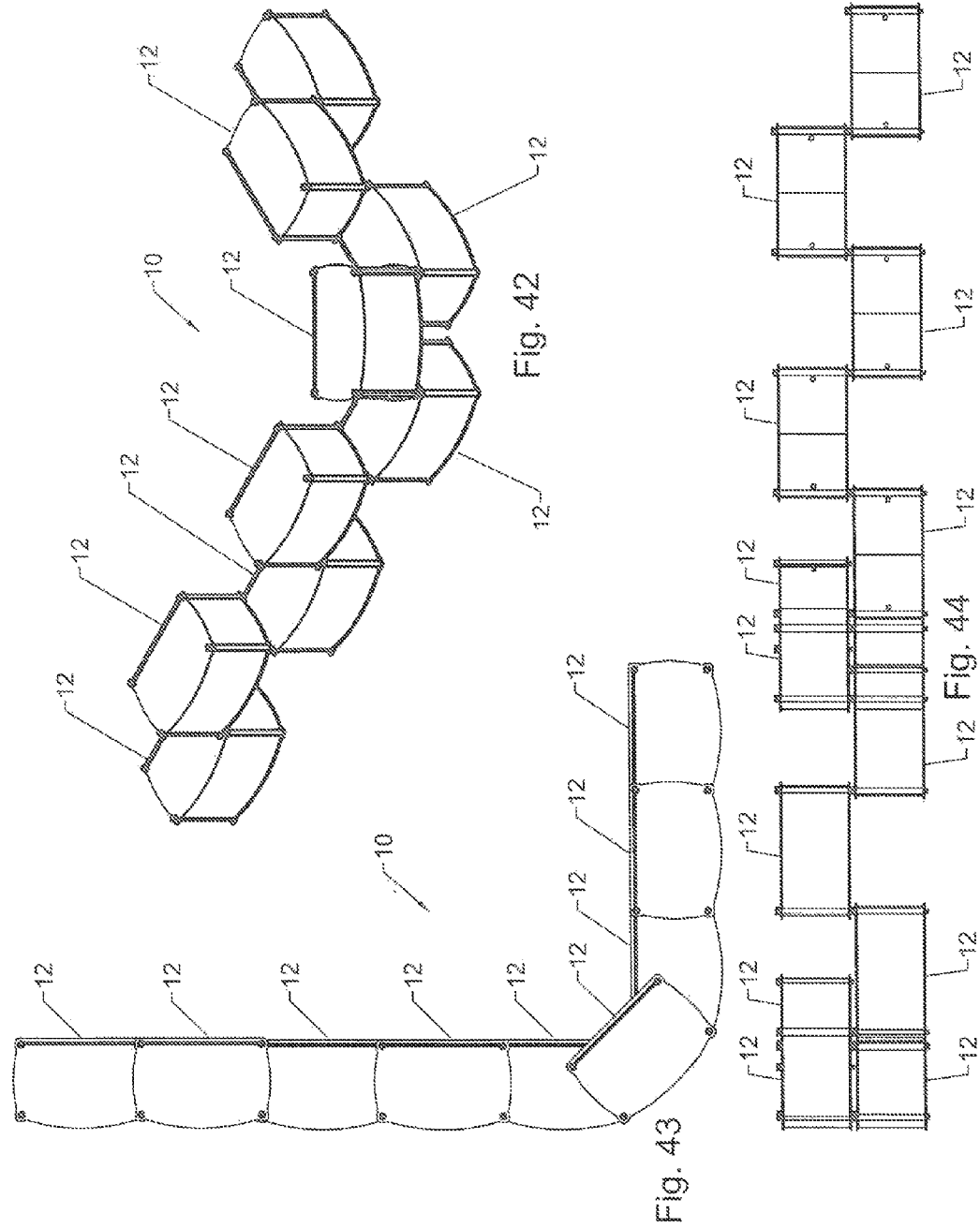

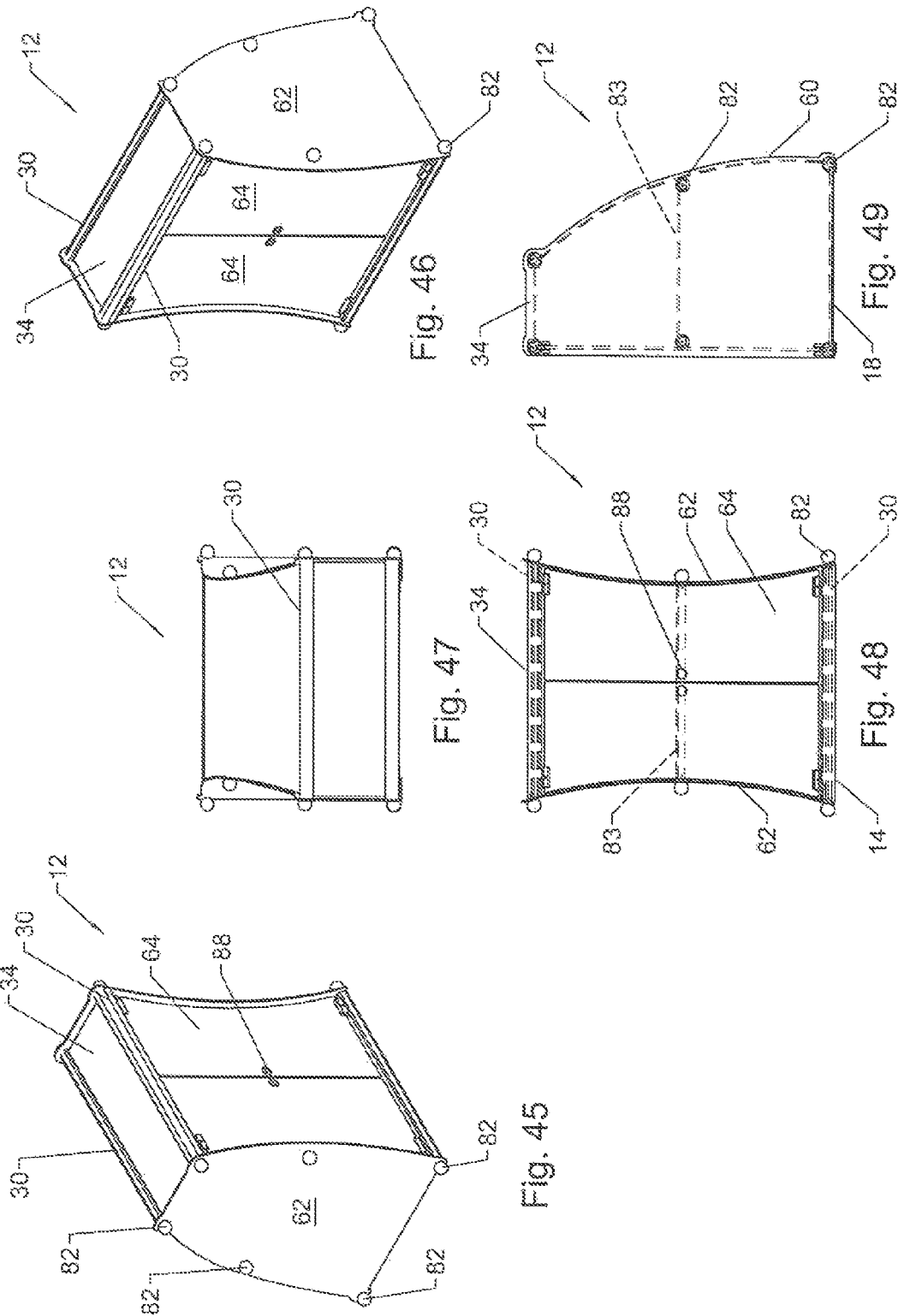

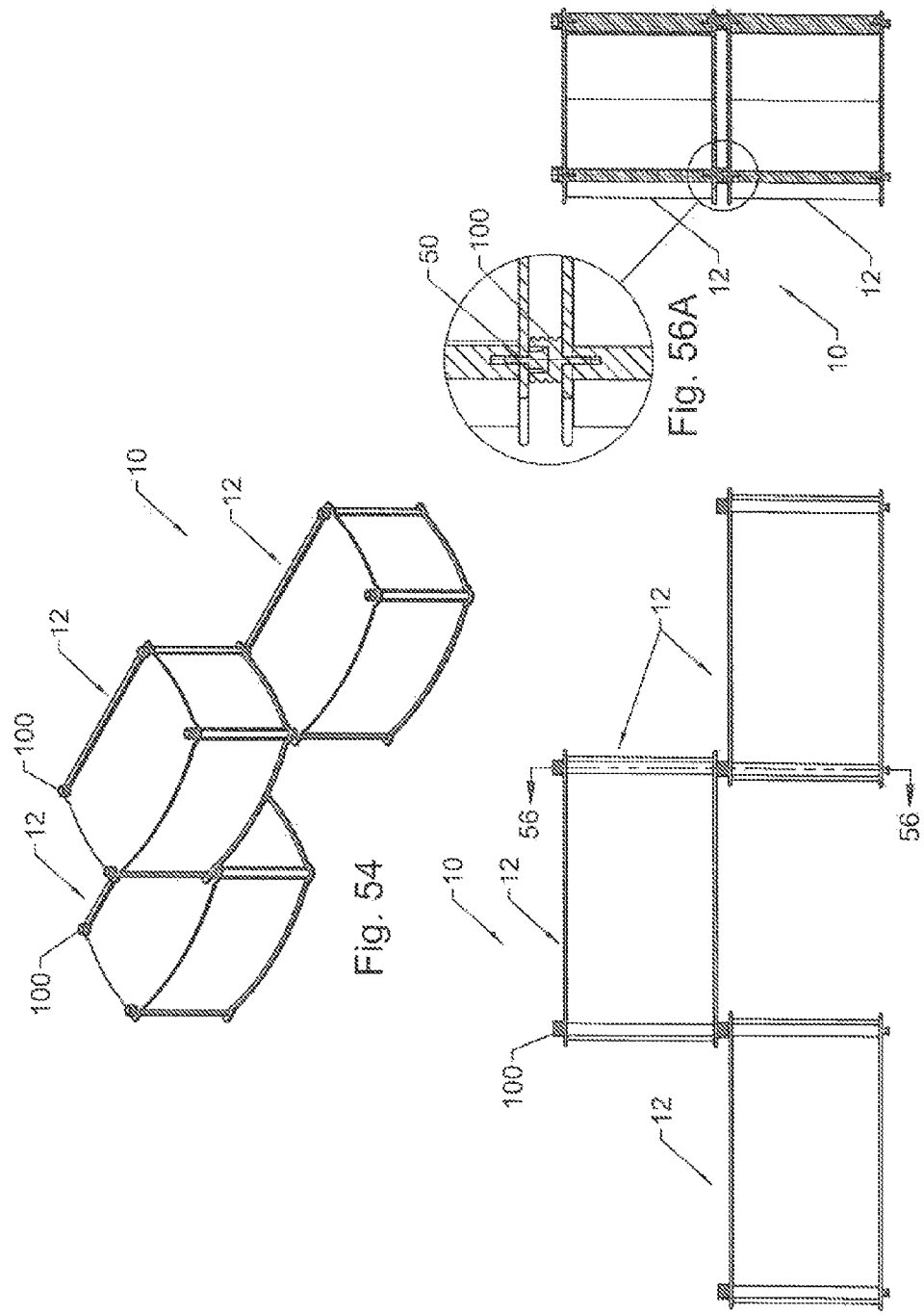

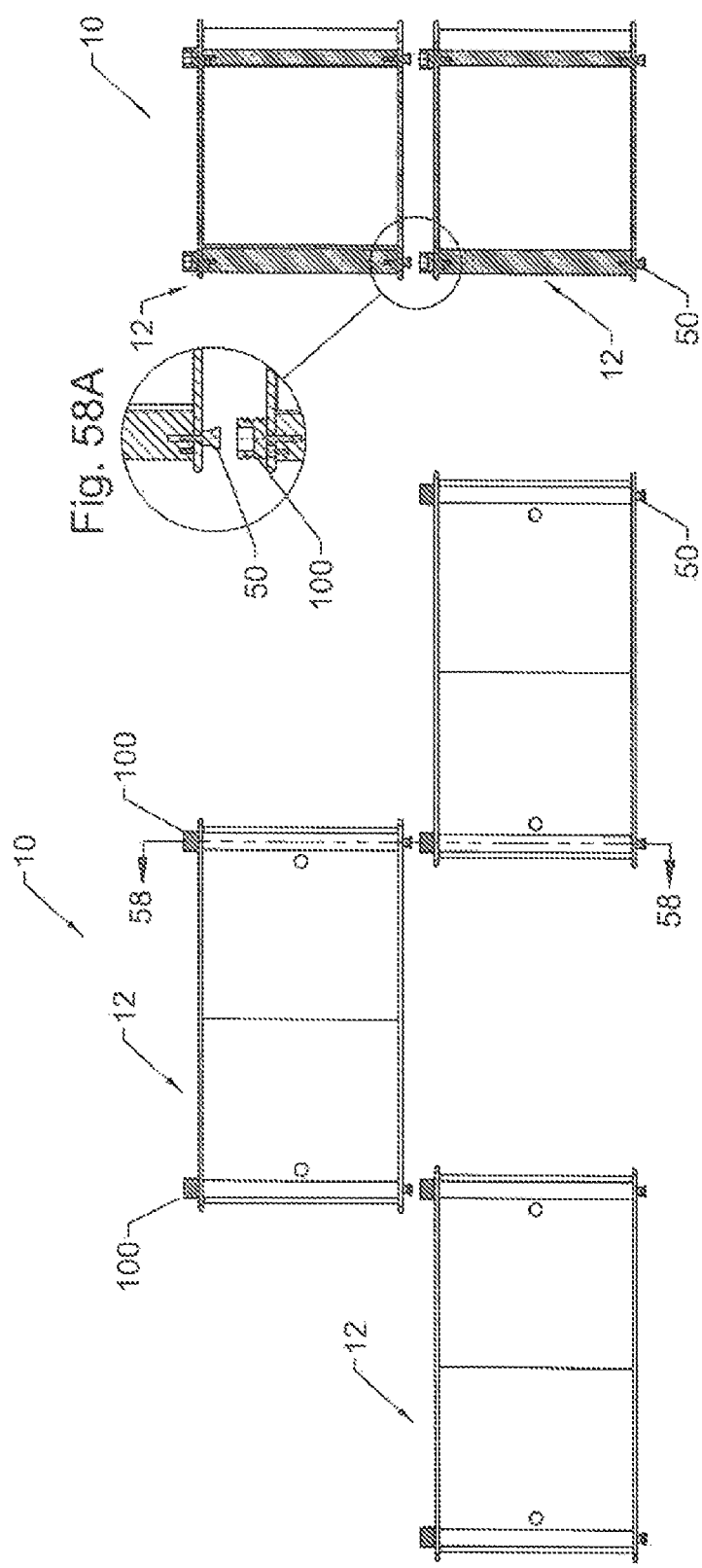

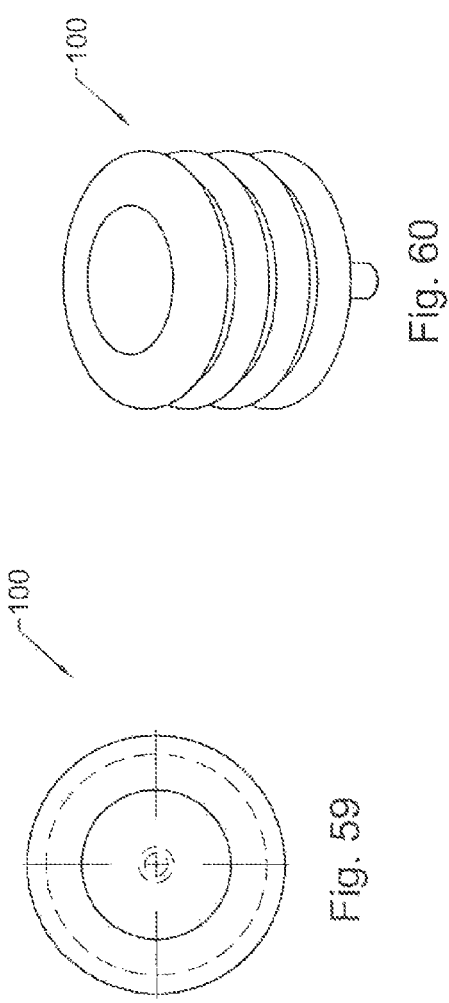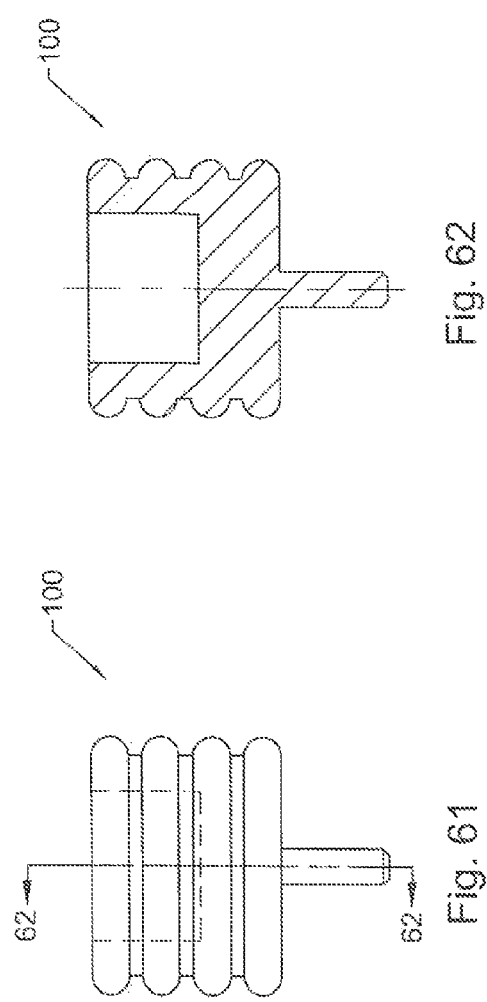

PORTABLE DISPLAY SYSTEM AND ASSOCIATED METHODS

FIELD OF THE INVENTION

The present invention relates to the field of display systems and, more particularly, to the field of portable display systems and related methods.

BACKGROUND OF THE INVENTION

Portable display systems are generally necessary for individuals to display certain works at various locations. For example, jewelers or other artists that may participate in art shows or trade shows may have a need to display certain works in a display case. It is also desirable for the display cases to be secured. Prior art display cases, however, may be somewhat complicated to assemble and cumbersome to transport. Further, prior art portable display cases may not include enhanced security features suitable for securing the articles that are to be displayed.

International Publication No. WO 93/03242 by Weinrub, discloses a portable display assembly. The portable display assembly is used for displaying a variety of articles on a wall structure. The display assembly includes a plurality of vertical frame units adapted to be interconnected at spaced-apart intervals by scissor connectors. The display assembly is also adapted to be collapsible for easy transport.

U.S. Pat. No. 3,434,769 to Salet, discloses a collapsible display case. The collapsible display case includes a base, a plurality of sidewalls, and a top that are all hinged together. U.S. Pat. No. 6,626,119 to Wilton discloses a display kit and display arrangement including a collapsible pedestal base unit. The display kit and display arrangement do not include sidewalls. Instead, the display kit and display arrangement include a plurality of legs that are connected by a scissor frame and that may be collapsible for storage within a large case.

U.S. Pat. No. 5,259,669 to Leach, et al. discloses a collapsible trade show display case. The trade show display case includes a pair of legs that support a display case. The unit is collapsible so that the display case and legs fit into a large suitcase that may be vertically transported. The display case does not, however, collapse to a substantially flat configuration.

U.S. Pat. No. 5,826,397 to Arnold discloses a collapsible frame work for a trade show display case. The frame work includes a base having legs that are pivotally connected thereto. The frame work is adapted to hold informational material in a space allocated to a vendor. More particularly, the display includes a plurality of hub members connected with a plurality of support members. The system also includes diagonal support members that are pivotally coupled to the hub members and horizontal support members having a pivot point at their mid-point to be pivotally connected between pairs of adjacent hubs.

SUMMARY OF THE INVENTION

In view of the foregoing background, it is therefore an object of the present invention to provide a portable display system including at least one display unit that is collapsible and easy to transport and assemble. It is also an object of the present invention to provide a portable display system that may be transported in a substantially flat configuration. It is further an object of the present invention to provide a portable display system including at least one portable display unit that includes security features to secure items being displayed within the display unit. It is still further an object of the present invention to provide a display system that may be readily assembled without the use of tools.

These and other objects, features, and advantages in accordance with the present invention are provided by a portable display system comprising a display unit. The display unit may comprise a base having a top, a bottom, a rear, sides extending outwardly from the rear, a curved front opposite the rear, a plurality of passageways formed therein, and door receiving recesses formed in the top and extending laterally adjacent the rear.

The display unit may also comprise a plurality of posts adapted to engage the base to extend upwardly therefrom. Each of the plurality of posts preferably include engagement member receiving recesses formed in end portions thereof. The display unit may further comprise a top adapted to engage the plurality of posts. The top preferably includes a top, a bottom, a rear, sides extending outwardly from the rear, a curved front, a plurality of passageways formed therein, and door receiving recesses formed in the bottom and extending laterally adjacent the rear.

The display unit may further comprise a plurality of base fasteners adapted to extend through the passageways formed in the base to fasten the plurality of posts to the bases. The display unit may still further comprise a plurality of top fasteners adapted to extend through the passageways formed in the top to fasten the top to the posts. The use of the top and bottom fasteners to engage the posts advantageously allows for fast and simple assembly of the display unit, and also advantageously eliminates the need to use tools to assemble the display unit.

The display unit may also comprise a front panel, side panels, and at least a pair of rear panels. Each of the plurality of posts may include at least one panel receiving recess formed therein for receiving side portions of each of the front panel, side panels and rear panels. The front panel may be curved when positioned to engage the at least one panel receiving recess formed on the plurality of posts. The curve of the front panel may be defined by a predetermined radius. Further, the curve of the front of the base may be defined by a predetermined radius. The radii of the curve of the front panel and the curve of the front of the base are preferably substantially similar. The front panel, side panels and rear panels advantageously provide the display unit with an enclosure to enhance security of items being displayed therein.

In one embodiment, the engagement member receiving recesses are preferably threaded, and the plurality of base fasteners and the plurality of top fasteners may also be threaded. The threaded configuration of the top fasteners, bottom fasteners and engagement member receiving recesses advantageously allows for quick assembly of the display unit. This configuration also advantageously eliminates the need for additional parts that may be necessary in prior art units, thereby enhancing the efficiency of transporting the display unit.

In another embodiment of the display unit, the engagement member receiving recesses adjacent an upper portion of each of the plurality of posts may be defined by a j-shaped recess formed therein. In this embodiment of the posts, the plurality of top fasteners may include a lock member to engage the j-shaped recesses. This embodiment also advantageously allows for fast and simplified assembly of the display unit.

In still another embodiment of the display unit, a respective plurality of post engagement members may be included. The plurality of post engagement members are preferably adapted to be threadably connected to the engagement member receiving recesses formed adjacent an upper portion of each of the respective plurality of posts. Each of the respective post engagement members may include a j-shaped recess formed therein, and each of the plurality of top fasteners may include a lock member to engage the j-shaped recesses.

In yet another embodiment of the display unit, an upper portion of each of the plurality of posts may comprise a recessed portion extending substantially the entire circumference thereof. Each of the respective plurality of top fasteners may include a spring loaded lock member to engage the recessed portion. This embodiment of the display unit is advantageous as it requires substantially less time to secure the fasteners to the posts, thereby increasing efficiency of assembly of the display unit.

One other embodiment of the display unit includes a respective plurality of post engagement members adapted to be threadably connected to the engagement member receiving recessed formed adjacent an upper portion of each of the respective plurality of posts. Each of the respective post engagement members may include a recessed portion extending substantially the circumference thereof, and each of the respective plurality of top fasteners may include a spring loaded lock member to engage the recessed portion.

The top of the display unit may include a locator recess formed adjacent the passageways. A locator member may be carried by an upper portion of each of the plurality of posts to engage the locator recess. The use of the locator recess and the locator member advantageously enhances alignment of the posts during installation to thereby decrease the time necessary to install the front panel, the side panels and the rear panels.

The display unit may comprise a plurality of display units adapted to stackably connect to one another. In such a configuration, a top of a lower one of the plurality of display units is an intermediate top that defines a top of the lower one of the plurality of display units and a base of an upper one of the plurality of display units. This configuration of the stackable display units advantageously allows users to customize the configuration of the display system depending upon need.

The rear panels may be adapted to slidably engage the door receiving recesses, and may each include at least one lock receiving passageway for receiving a lock that prevents the rear panels from slidably moving along the door receiving recesses. The inclusion of a lock to engage the lock receiving passageways advantageously enhances security of the display unit, and, more particularly, security of items being displayed in the display unit.

The portable display system may also advantageously include a carrying case. The carrying case may include a plurality of compartments shaped to accommodate the base, the plurality of posts, the top, and the plurality of top and bottom fasteners. The carrying case advantageously allows a user to readily transport the display unit of the display system.

A method of assembling a portable display system includes extending the plurality of base fasteners through the passageways formed in the base to engage the engagement member receiving recesses on the bottom portion of the posts to fasten the plurality of posts to the base. The method may also include extending the plurality of top fasteners through the passageways formed in the top to engage the engagement member receiving recesses on the upper portion of the posts to fasten the plurality of posts to the top. The method may further include engaging the front panel and the pair of opposing side panels with the panel receiving recesses formed in the plurality of posts, and slidably engaging the pair of rear panels with the door receiving recesses formed in the top and the base so that the rear panels laterally slide with respect to the top and the base.

BRIEF DESCRIPTION OF THE DRAWINGS

FIG. 2 is an exploded perspective view of the display unit illustrated in FIG. 1.

FIG. 2A is a detailed view of a rear post of the display unit illustrated in FIG. 2.

FIG. 3 is an exploded perspective view of a post engagement member of a display unit illustrating a top fastener to be engaged with the post engagement member.

FIG. 4 is a partial perspective view of an embodiment of a post configured to use the top fastener illustrated in FIG. 3.

FIG. 7 is a front elevation view of a display unit showing the post engagement member illustrated in FIG. 5.

FIG. 8 is a cross sectional view of the post illustrated in FIG. 7 taken through line 8-8.

FIG. 9 is a detailed view of the post engagement member and top fastener illustrated in FIG. 8 and having portions broken away.

FIG. 12 is a rear elevation view of a pair of stacked display units according to the present invention.

FIG. 13 is a top plan view of the display units illustrated in FIG. 12.

FIG. 14 is a perspective view of the display units illustrated in FIG. 12.

FIG. 15 is a front elevation view of the display units illustrated in FIG. 12.

FIG. 16 is a right side elevation view of the display units illustrated in FIG. 12.

FIG. 17 is a left side elevation view of the display units illustrated in FIG. 12.

FIG. 18 is a detailed view of a connector between a lower display unit and an upper display unit of the stackable display units illustrated in FIG. 12.

FIG. 19 is an exploded perspective view of the display units illustrated in FIG. 12.

FIG. 20 is a perspective view of a display unit of a display system according to the present invention and including a lock.

FIG. 21 is a detailed view of the lock illustrated in FIG. 20.

FIG. 22 is a perspective view of an alternate configuration of stackable display units.

FIG. 23 is a top plan view of the display units illustrated in FIG. 22.

FIG. 24 is another perspective view of the display units illustrated in FIG. 22.

FIG. 25 is a left side elevation view of the display units illustrated in FIG. 22.

FIG. 26 is a rear elevation view of the display units illustrated in FIG. 22.

FIG. 27 is a sectional view of the display unit illustrated in FIG. 26 taken through line A-A.

FIG. 27A is a detailed view of a connection between a front upper panel of the display unit illustrated in FIG. 22 and the top of the display unit illustrated in FIG. 22.

FIG. 28 is a perspective view of the plurality of display units in a stacked and alternating configuration.

FIG. 29 is a top plan view of the display units illustrated in FIG. 28.

FIG. 30 is a front elevation view of the display units illustrated in FIG. 28.

FIG. 31 is a left side elevation view of the display units illustrated in FIG. 28.

FIG. 32 is a right side elevation view of the display units illustrated in FIG. 28.

FIG. 33 is a detailed view of a connector between the lower display unit and the upper display unit of the configuration of display units illustrated in FIG. 28.

FIG. 34 is a perspective view of a plurality of display units in a curved, stacked and alternating configuration.

FIG. 35 is a top plan view of the display unit configuration illustrated in FIG. 34.

FIG. 36 is a front elevation view of the display unit configuration illustrated in FIG. 34.

FIG. 37 is a rear elevation view of the display unit configuration illustrated in FIG. 34.

FIG. 38 is a perspective view of another display unit configuration.

FIG. 39 is a top plan view of the display unit configuration illustrated in FIG. 38.

FIG. 40 is a front elevation view of the display unit illustrated in FIG. 38.

FIG. 41 is a rear elevation view of the display unit illustrated in FIG. 38.

FIG. 42 is a perspective view of still another configuration of a plurality of display units in a curved, stacked and alternating configuration.

FIG. 43 is a top plan view of the display unit configuration illustrated in FIG. 42.

FIG. 44 is a rear elevation view of the display unit configuration illustrated in FIG. 42.

FIGS. 45 and 46 are perspective views of another embodiment of a display unit of the display system according to the present invention.

FIG. 47 is a top plan view of the display unit illustrated in FIGS. 45 and 46.

FIG. 48 is a rear elevation view of the display unit illustrated in FIGS. 45 and 46.

FIG. 49 is a side elevation view of the display unit illustrated in FIGS. 45 and 46.

FIG. 54 is a perspective view of the plurality of display units illustrated in FIG. 53.

FIG. 55 is a front elevation view of the plurality of display units illustrated in FIG. 53.

FIG. 56 is a sectional view of the plurality of display units illustrated in FIG. 55 and taken through line A-A.

FIG. 56A is a detailed view of a connection between the upper and lower display units illustrated in FIG. 56.

FIG. 57 is a rear elevation view of the plurality of display units illustrated in FIG. 54.

FIG. 58 is a sectional view of the plurality of display units illustrated in FIG. 57 and taken through line A-A.

FIG. 58A is a detailed view of a connection between the upper and lower display units illustrated in FIG. 58.

FIG. 59 is a top plan view of a connector knob illustrated in FIG. 58A.

FIG. 60 is a perspective view of a connector knob illustrated in FIG. 59.

FIG. 61 is a front perspective view of the connector knob illustrated in FIG. 61.

FIG. 62 is a sectional view of the connector knob illustrated in FIG. 61 and taken through line A-A.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notation is used to indicate similar elements in alternate embodiments.

Figure 1:
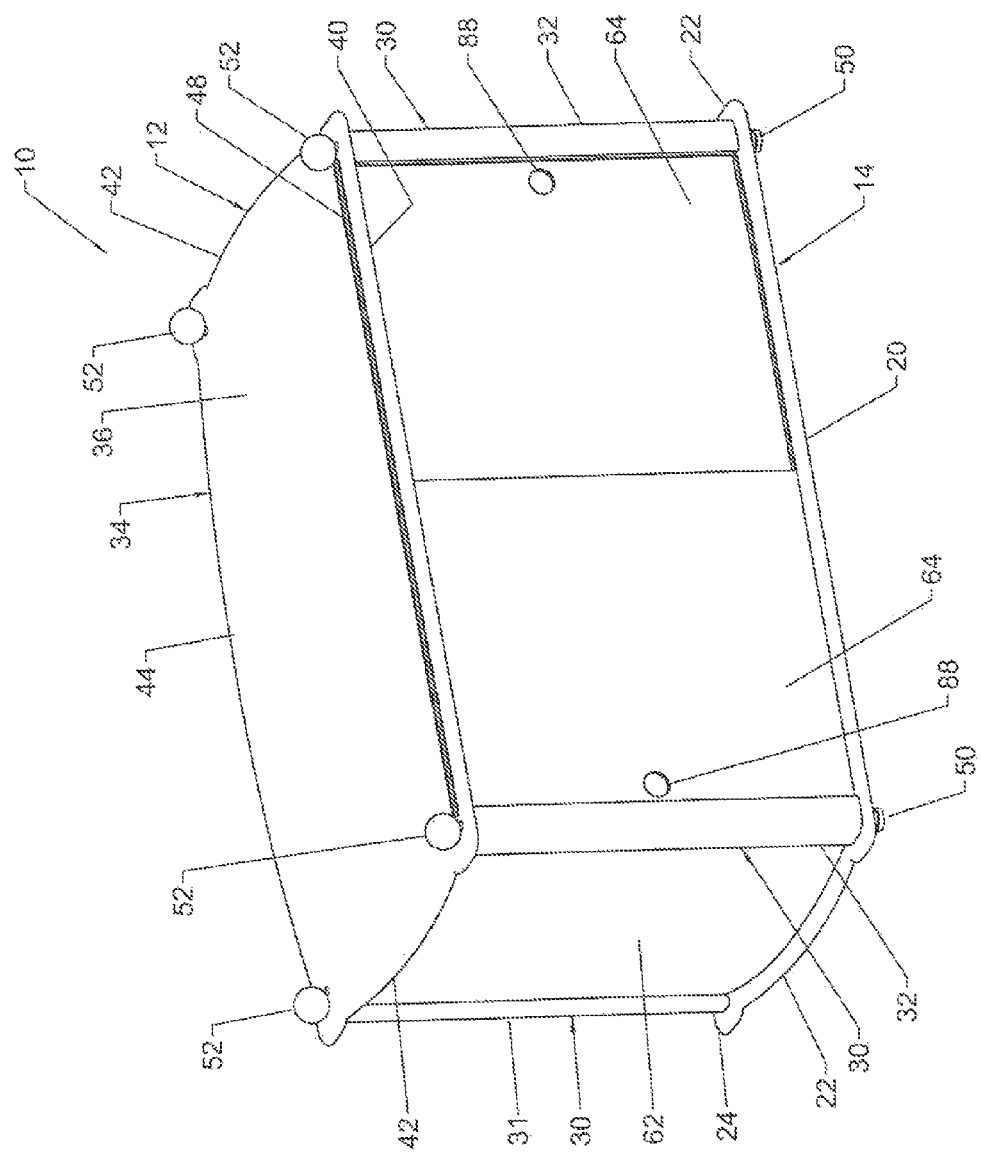
FIG. 1 is a perspective view of a display unit of a display system according to the present invention.

Referring initially to FIGS. 1 and 2, a display unit 12 of a display system 10 according to the present invention is now described in greater detail. In this embodiment of the display system 10, a single display unit 12 is used. As will be described in greater detail below, any number of display units 12 may be used to construct the display system 10. The display unit includes a base 14, posts 30, a top 34, a plurality of base fasteners 50, and a plurality of top fasteners 52.

More specifically, the base 14 has a top 16, a bottom 18, a rear 20, sides 22 extending outwardly from the rear, a curved front 24 opposite the rear, a plurality of passageways 26 formed therein, and a plurality of base door receiving recesses 28 formed in the top and extending laterally adjacent the rear. The illustrated embodiment of the base 14 includes ornamental designs, such as, for example, a curved front 24, curved sides 22, and curved corner portions. Those skilled in the art, however, will appreciate that the shapes of the front 24 of the base 14, sides 22 of the base and corner portions may be defined by any other shape.

The plurality of posts 30 are adapted to engage the base 14 and extend upwardly therefrom. Each of the plurality of posts 30 preferably include engagement member receiving recesses 33 formed in end portions thereof. More specifically, the engagement member receiving recesses 33 are preferably formed adjacent upper and lower end portions of each of the posts 30. The posts 30 preferably include front posts 31 and rear posts 32.

A detail of a top portion of a rear post 32 is illustrated in FIG. 2A. The rear post 32 illustratively includes a plurality of post door receiving recesses 54 formed longitudinally along side portions thereof. The post door receiving recesses 54 preferably have a curved shape and are positioned to align with the base door receiving recesses 28 formed in the base 14. As will be described in greater detail below, a plurality of rear panels 64 may slidably engage the base door receiving recesses 28 in the base 14 as well as the post door receiving recesses 54 in the rear posts 32. The post door receiving recesses 54 preferably extend longitudinally substantially the length of the rear post 32.

The rear post 32 also includes side panel receiving recesses 56 formed longitudinally along a side portion thereof adjacent the post door receiving recesses 54. The front post 31 also illustratively includes a side panel receiving recess 56. The side panel receiving recess 56 preferably extends longitudinally substantially the length of each of the front and rear posts 31, 32. When the front post 31 and the rear post 32 are engaged to the base 14, the side panel receiving recesses 56 are preferably positioned opposite one another and aligned to receive a side panel 62. The engagement between the side panel 62 and the front and rear posts 31, 32 will be described in greater detail below.

The front posts 31 also illustratively include a front panel receiving recess 58 extending longitudinally along the side portion thereof substantially the entire length of the front post. The front panel receiving recess 58 is illustratively positioned adjacent the side panel receiving recess 56. As illustrated in FIG. 2, when the front posts 31 are positioned to engage the base 14, the front panel receiving recesses 58 are preferably aligned to engage a front panel 60. Engagement of the front panel 60 to the front panel receiving recesses 58 in the front posts 31 will be described in greater detail below.

The display unit 12 also illustratively includes a top 34. The top 34 is adapted to engage the plurality of posts 30 to overlie the base 14. The top 34 includes a top portion 36, a bottom portion 38, a rear 40, sides 42 extending outwardly from the rear, a curved front 44, and passageways formed in the top 46. The top 34 also includes a plurality of top door receiving recesses 48 formed therein along the bottom 38 and extending laterally adjacent the rear 40. Those skilled in the art will appreciate that although the top 34 is illustrated as having a curved front 44, curved sides 42 and curved corner portions, the portions of the top may have any shape desired. Further, the top illustrated in FIGS. 1 and 2 show the plurality of top door receiving recesses 48 formed on the top portion 36. Those skilled in the art will appreciate that the inclusion of door receiving recesses in the top 36 as well as the bottom 38 advantageously allows the top 34 and the base 14 to be interchangeable.

The top door receiving recesses 48 formed in the bottom 38 of the top are preferably aligned with the post door receiving recesses 54 on the rear posts 32 and the base door receiving recesses 28 on the base 14. Accordingly, the rear door panels 64 may slidably engage the top door receiving recesses 48 on the top, the base door receiving recesses 28 on the base 14 and the post door receiving recesses 54 on the rear posts 32 when the top and the base are fastened to the posts.

The door receiving recesses 48 formed in the bottom 38 of the top are preferably aligned with the door receiving recesses 54 on the rear posts 32 and the door receiving recesses 28 on the base 14. Accordingly, the rear door panels 64 may slidably engage the door receiving recesses 48 on the top, the door receiving recesses 28 on the base 14 and the door receiving recesses 54 on the rear posts 32 when the top and the base are fastened to the posts.

The display unit also includes a plurality of base fasteners 50. The plurality of base fasteners 50 are each illustratively adapted to extend through the passageways 26 formed in the base 14. The plurality of base fasteners 50 are preferably used to fasten the posts 30 to the base 14. Similarly, each display unit 12 also includes a plurality of top fasteners 52 that are adapted to extend through the passageways 46 in the top 34 to fasten the top to the posts 30. More specifically, the base fasteners 50 and the top fasteners 52 preferably extend through the respective passageways 26, 46 in the base 14 and top 34 to engage the engagement member receiving recesses 33 formed in the upper and lower end positions of the posts 30.

As discussed in detail above, the display unit 12 includes a front panel 60, side panels 62, and a pair of rear door panels 64. Although a pair of rear door panels 64 are illustrated, those skilled in the art will appreciate that any number of rear door panels may be included to accomplish the goals of the present invention. When installed on the display unit 12, the front panel 60 may engage the front panel receiving recesses 58 on the front post 31 so that the front panel 60 is curved. More specifically, the front panel receiving recesses 58 are adapted to engage side portions of the front panel 60. The length between the front panel receiving recesses 58 may be shorter than the length of the front panel 60. Those skilled in the art will appreciate, however, that the front panel 60 does not necessarily need to be curved and can, for example, engage the front panel receiving recesses 58 of the front posts 31 in any manner. It is preferable that the front panel 60 be made of a substantially flexible material, such as, for example, Plexiglas®, or any other material having flexibility and that is substantially transparent. Accordingly, when the front panel 60 is installed between the front panel receiving recesses 58 of the front posts 31, the front panel may be curved.

It is preferable that the curve of the front panel 60 is substantially similar to the curve of the front 24 of the base 14 and the curve of the front 44 of the top 34. More specifically, the curve of the front panel 60 may be defined by a predetermined radius when installed to engage the posts 30. The curve of the front 24 of the base 14 may also be defined by a predetermined radius, as may the curve of the front 44 of the top 34. Accordingly, the radii of the curve of the front panel 60, the curve of the front 24 of the base 14 and the curve of the front 44 of the top 34 are preferably substantially similar. Again, those skilled in the art will appreciate that the front panel 60 need not be curved when installed between the posts 30 to achieve the goals of the present invention. Similarly, the front 24 of the base 14 and the front 44 of the top 34 also need not be curved to accomplish the goals of the present invention.

As perhaps best illustrated in FIG. 2, the engagement member receiving recesses 33 in the top and bottom portions of each of the posts 30 are preferably threaded. Further, each of the base fasteners 50 and top fasteners 52 may also be threaded. Accordingly, the base fasteners 50 may be extended through the passageways 26 in the base 14 and threadably connected to the engagement member receiving recesses 33 formed in the bottom portions of the posts 30. Similarly, the top fasteners 52 may be extended through the passageways 46 in the top 34 and threadably connected to the engagement member receiving recesses 33 formed in a top portion of each of the posts 30.

Referring now additionally to FIGS. 3 and 4, another embodiment of the posts 30' and the top fasteners 52' are now described in greater detail. As perhaps best illustrated in FIG. 4, each of top fasteners 52' may include a post engagement member 68' having a bottom portion that is threaded. Each of the post engagement members 68' is preferably defined by a j-shaped recess 70' formed in the upper portion of each of the post engagement members. Further, each of the top fasteners 52' may include a lock member 53' to engage the j-shaped recess 70'. The post engagement member 68' may be threadably connected to a threaded engagement member receiving recess (not shown) in the post 30'. Alternatively, and as perhaps best illustrated in FIG. 4, the top of each of the posts 30' may be configured to include the j-shaped recess 70' so that a top fastener 52' having the lock member 53' integrated therein may be used to secure the top on the posts 30'.

In this embodiment of the posts 30' a washer 66' is preferably included and is adapted to be positioned between the top fasteners 52' and a top portion 36 of the top 34. The washer 66' is preferably made of a neoprene material, or any other type of substantially flexible material. The washer 66' advantageously provides a tighter fit between the lock member 53' of the top fastener 52' and the j-shaped recess 70' on either the post engagement member 68' or an upper portion of the post 30', respectively. The other elements of this embodiment of the posts 30' and the top fasteners 52' are similar to those of the first embodiment, are labeled with prime notation and require no further discussion herein.

Figure 6A:
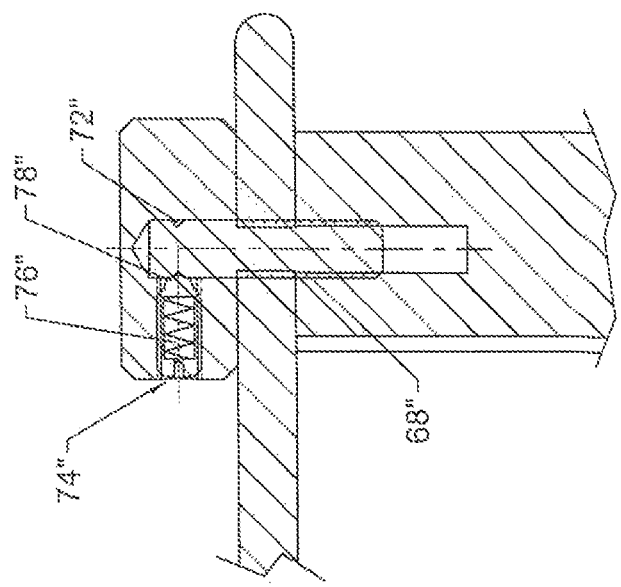
FIG. 6A is a partial perspective view of another embodiment of a post configured to use the top fastener illustrated in FIGS. 5 and 6.
Figure 6:
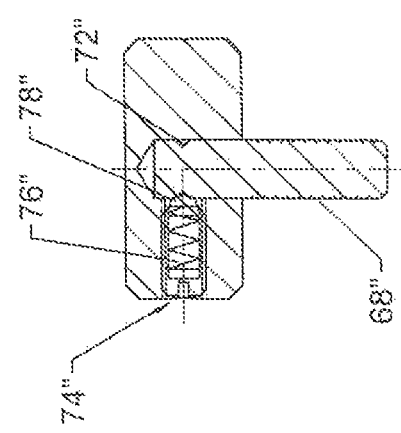
FIG. 6 is a cross sectional view of the post engagement member and top fastener illustrated in FIG. 5.
Figure 5:
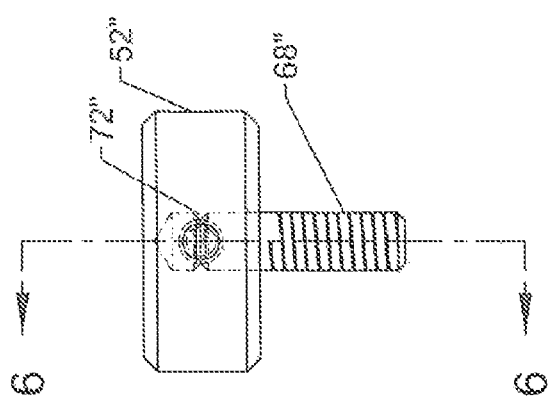
FIG. 5 is a perspective view of another embodiment of a post engagement member of a display unit and showing a top fastener engaging the post engagement member according to the present invention.

Referring now additionally to FIGS. 5 and 6, yet another embodiment of the posts 30" and top fasteners 52" are also described in greater detail. In this embodiment of the posts 30", the post engagement member 68" includes a recessed portion 72" extending substantially the entire circumference adjacent an upper portion thereof. The recessed portion 72" is preferably v-shaped. Further, the top fastener 52" may include a spring-loaded lock member 74". The spring-loaded lock member includes a spring 76" and a lock portion 78". The lock portion 78" is preferably a solid member that extends from the outer circumference of the top fastener 52" to a pointed end that engages the recessed portion 72" when the top fastener engages the post engagement member 68". More specifically, by applying force to a top portion of the top fastener 52", the lock portion 78" of the spring-loaded lock member 74" is moved over a top portion of the post engagement member 68" and is locked into place along the recessed portion 72".

A bottom portion of the post engagement member 68" is illustratively threaded. Accordingly, the post engagement member 68" may be threadably connected to the threaded engagement member receiving recesses (not shown) of the posts 30". Alternately, and as perhaps best illustrated in FIG. 6A, the top of each of the posts 30" may be configured to include the recessed portion 72" so that a top fastener 52" having the spring-loaded lock member 74" integrated therein may be used to secure the top on the posts 30".

Referring now additionally to FIGS. 7 through 9, additional features of the display unit 12" are now described in greater detail. More particularly, FIGS. 7 through 9 illustrate a post 30" of the display unit 12". The post 30" illustratively includes an engagement member receiving recess 33" along a bottom portion thereof. The engagement member receiving recess 33" is preferably threaded to receive a threaded base fastener not shown).

The top of the post 30" also includes an engagement member receiving recess 33" to receive a threaded post engagement member 68". The post engagement member 68" illustratively includes a j-shaped recess 70" adjacent an upper portion thereof and a bottom portion that is threaded to threadably engage the engagement member receiving recess 33" adjacent the top of the post 30". The post engagement member 68" illustratively extends upwardly from the top of the post. The top 34" is positioned to overlie the post 30" so that the post engagement member 68" extends upwardly from the top. The top fastener 52" includes a lock member 53" and is positioned to engage the post engagement member 68" so that the lock member engages the j-shaped recess 70" in the post engagement member threadably connected to the engagement member receiving recess 33".

Figures 10, 11:
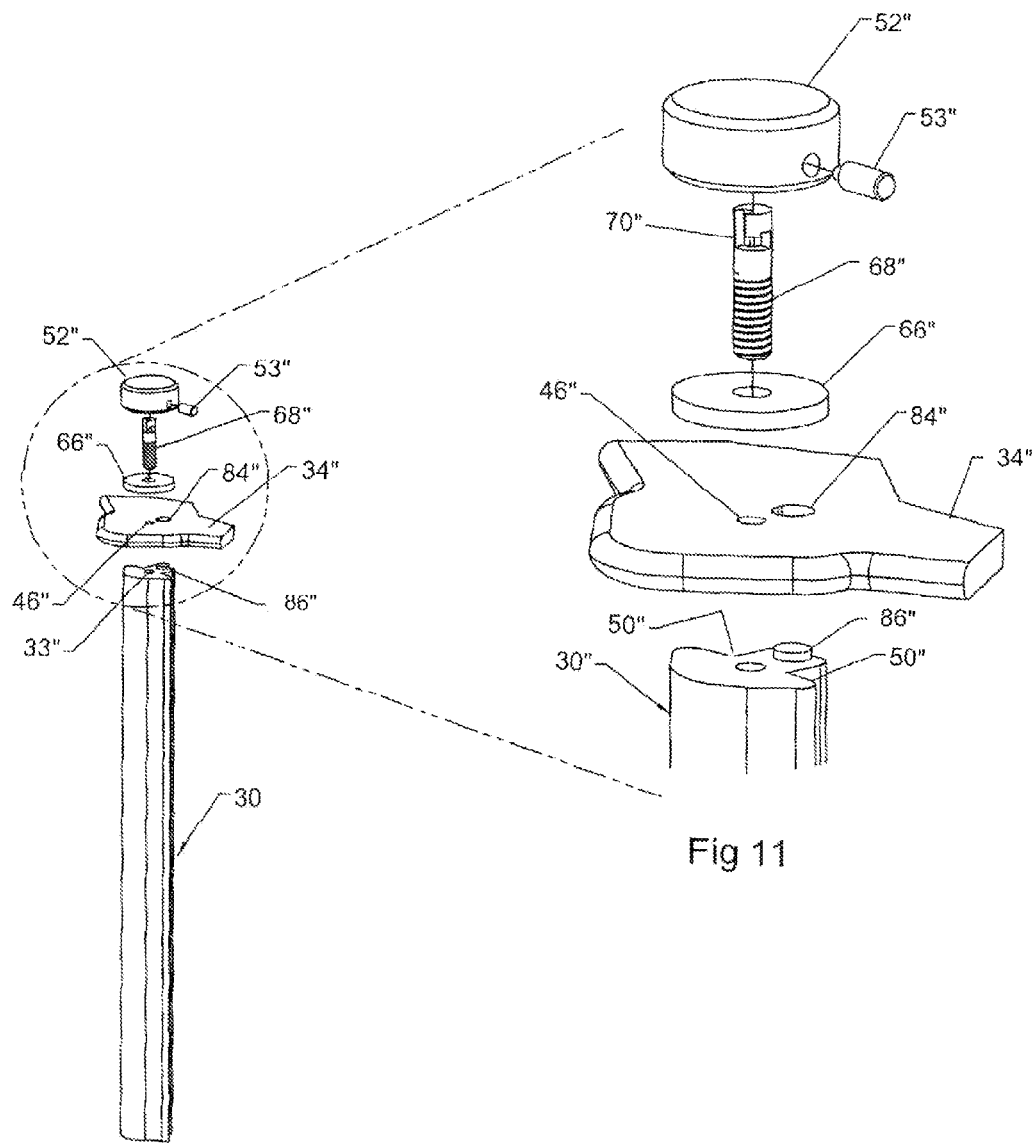
FIG. 10 is a perspective view of a post of a display unit according to the present invention and including the post engagement member and top fastener illustrated in FIG. 3.
FIG. 11 is a detailed view of the post engagement member illustrated in FIG. 10.

As illustrated in FIGS. 10 and 11, the washer 66" is positioned to overlie the top 34" to advantageously create a tighter fit when the top fastener 52" engages the post engagement member 68". As further illustrated in FIGS. 10 and 11, the top 34" of the display unit 12" may also include a locator recess 84". A locator member 86" is illustratively carried by an upper portion of the post 30" to engage the locator recess 84" formed in the top 34". The engagement between the locator member 86" and locator recess 84" advantageously allows the post 30" to be properly aligned when installed. The alignment of the post 30" is essential so that the front panel 60, side panels 62 and rear door panels 64 are properly aligned when installed. The other elements of this embodiment of the posts 30" and the top fasteners 52" are similar to those of the first embodiment, are labeled with prime notation and require no further discussion herein.

Referring now additionally to FIGS. 12 through 19, additional features of the display system 10 are now described in greater detail. More specifically, the display system 10 illustrated in FIGS. 12 through 19 include a pair of display units 12 configured in a stacked formation. Accordingly, a plurality of display units 12 may be adapted to be stackably connected to one another. In such a configuration, the top 34 of a lower one of the plurality of display units 12 may be defined as an intermediate top. The intermediate top defines a top 34 of the lower one of the display units 12b and a base 14 of the upper one of the display units 12a.

As perhaps best illustrated in FIG. 19, such a configuration includes a plurality of base fasteners 50 that engage a plurality of lower front posts 31a and the lower rear posts 32a. A plurality of intermediate fasteners 51 are positioned to engage the lower rear posts 32a and lower front posts 31a. More particularly, the intermediate fasteners 51 are preferably threadably connected into engagement member receiving recesses 33 formed in the top portion of each of the lower front and rear posts 31a, 32a. The intermediate top 34 that also acts as a base 14 for the upper display unit is positioned to overlie the front and rear lower posts 31a, 32a so that the intermediate fasteners 51 extend through the passageways 26, 46 in the intermediate top 14, 34.

A locator member 86 may also be included to engage a recess formed in an upper portion of each of the lower front and rear posts 31a, 32a and to engage a locator recess formed in a bottom portion of the intermediate top 14, 34. Upper front and rear posts 31b, 32b threadably engage the intermediate fastener 51 to be fastened to the intermediate top 14, 34. Thereafter, the top 34 may be positioned to overlie the upper front and rear posts 31b, 32b, and top fasteners 52 may be positioned to extend through the passageways 46 in the top to threadably engage the engagement member receiving recesses 33 formed in the upper front and rear posts 31b, 32b.

The base 14, the intermediate top 14, 34 and the top 34 each preferably include passageways 26, 46, as well as, respectively, base door receiving recesses 28, and top door receiving recesses 48. Accordingly, the base 14, intermediate top 14, 34 and top 34 are preferably identical and, as such, may be interchangeable. Further, the upper front and rear posts 31*b*, 32*b* also include locator members 86 to engage locator recesses 84 formed in the top 34.

The pair of display units 12 also include upper and lower front panels 60*a*, 60*b*, upper and lower side panels 62*a*, 62*b*, and upper and lower rear door panels 64*a*, 64*b*. The upper and lower front panels 60*a*, 60*b*, the upper and lower side panels 62*a*, 62*b* and the upper and lower rear door panels 64*a*, 64*b* preferably engage the front and rear, upper and lower post members 31*a*, 32*a* and 31*b*, 32*b* as described above and as also illustrated in FIG. 2. Accordingly, when fully installed, the pair of display units 12 may include the curved front panel 60*a*, 60*b*, and curved side panels 62*a*, 62*b*. Those skilled in the art will appreciate, however, that the front panels 60*a*, 60*b* and the side panels 62*a*, 62*b* need not be curved to accomplish the goals of the present invention.

Referring now additionally to FIGS. 20 and 21, additional features of the display unit 12 are now described in greater detail. Each of the rear door panels 64 may include lock receiving passageways 88 formed therethrough. The locked receiving passageways are adapted to selectively receive a lock member 90 to advantageously secure the display unit 12. The lock member 90 is illustrated as a conventional key lock, but those skilled in the art will appreciate that any other type of lock may be used to accomplish the security feature of the display unit 12. Further, those skilled in the art will appreciate that any device that engages the lock receiving passageways 88 formed in the rear door panels 64 to restrict the door panels from slidable movement, such as, for example, a zip tie, may also be used to accomplish the security features of the display unit 12.

Referring now additionally to FIGS. 22 through 27, another configuration of the display system 10 is described in greater detail. The configuration of the display system 10 illustrated in FIGS. 22 through 27 includes an upper display unit 12*a* and a lower display unit 12*b*. The lower display unit 12*b* is similar to the display units illustrated in FIGS. 1 and 2 and in FIGS. 12 through 19. The upper display unit 12*a* is similar to the lower display unit 12*b*, but does not include front posts 31. Accordingly, the front panel 60 on the upper display unit 12*a* may be adapted to engage the rear posts 32. More specifically, the front panel 60 on the upper display unit 12*a* may be adapted to engage the side panel receiving recesses 56 formed in each of the rear posts 32. Therefore, the front panel 60 on the upper display unit 12*a* has a much larger curvature than the front panel 60 on the lower display unit 12*b*.

Similarly, the top 34 of the upper display unit 12*a* preferably has a front 44 having a substantially larger curve than the front 44 of the top of the lower display unit. Those skilled in the art will appreciate that the front 44 on the top 34 of the upper display unit 12*a* need not be curved and may, for example, have any shape desired. The engagement between the upper display unit 12*a* and the lower display unit 12*b* of the configuration of the display system 10 illustrated in FIGS. 22 through 27 is substantially similar to the engagement between the upper and lower display units illustrated in FIGS. 12 through 19 and, as such, require no further discussion herein.

Referring to FIG. 27A, a connection between the front panel 60 of the upper display unit 12*a* and the top 34 of the upper display unit is now described in greater detail. More particularly, a bottom portion of the top 34 may include a grove formed therein. An upper portion of the front panel 60 on the upper display unit 12*a* may engage the grove to advantageously provide stability when installed to extend between the rear posts 32.

Referring now additionally to FIGS. 28 through 32, another configuration of the display system 10 is now described in greater detail. In this configuration of the display system 10, a plurality of display units 12 are illustratively stackably connected to one another in a staggered formation. Accordingly, a right side of a lower one of the display units 12*a* may engage a left side of an upper one of the display units 12*b*. Similarly, a left side of a lower one of the display units 12*c* may engage a right side of an upper one of the display units 12*b*. All of the display units 12 are adapted to engage one another in a similar fashion. The connection between the stackable display units in the configuration of the display system 10 illustrated in FIGS. 28 through 32 is similar to that illustrated in FIGS. 12 through 19, and require no further discussion herein.

Referring now additionally to FIGS. 34 through 37, yet another configuration of the display units is described in greater detail. In this configuration, not only are the plurality of display units 12 stackably connected to one another in staggered formation, but the display units are also curved. Other stackable and staggered configurations of the display units that are also configured in a curved formation are illustrated in FIGS. 38 through 44. The curved formation is possible by engaging a pair of display units, i.e., the unit at the bend so that the front posts of the lower display units engage the front posts of the upper display units, and the rear posts of the upper display units do not engage the rear posts of the lower display units.

Referring now additionally to FIGS. 45 through 49, a vertical display unit 12 is now described in greater detail. The vertical display unit includes a base 14, side panels 62, and a top 34. The vertical display unit 12 also includes posts 30, but the posts are configured to extend horizontally between the side panels 62. The connection of the rear door panels 64 and the front panels 60 to the posts 30 are similar to the connections previously described, i.e., the front panel 60 and the rear door panel 64 engage the front panel receiving recesses (not shown) and the door receiving recesses (not shown) of the base 14 and the top 34.

The posts 30 are fastened to the side panels 62 using fasteners 82 similar to the base fasteners 50 and top fasteners 52 previously described. The vertical display unit 12 illustrated in FIGS. 45 through 49 may include a shelf 83 to be positioned between the base 14 and the top 34. The shelf 83 may be secured in place using a plurality of fasteners 82 that are the same fasteners used to secure the base 14 to the side panels 62 and the top 34 to the side panels 34. This configuration of the display unit 12 advantageously provides a two tiered display unit without the need to stack a plurality of display units.

Figure 50:
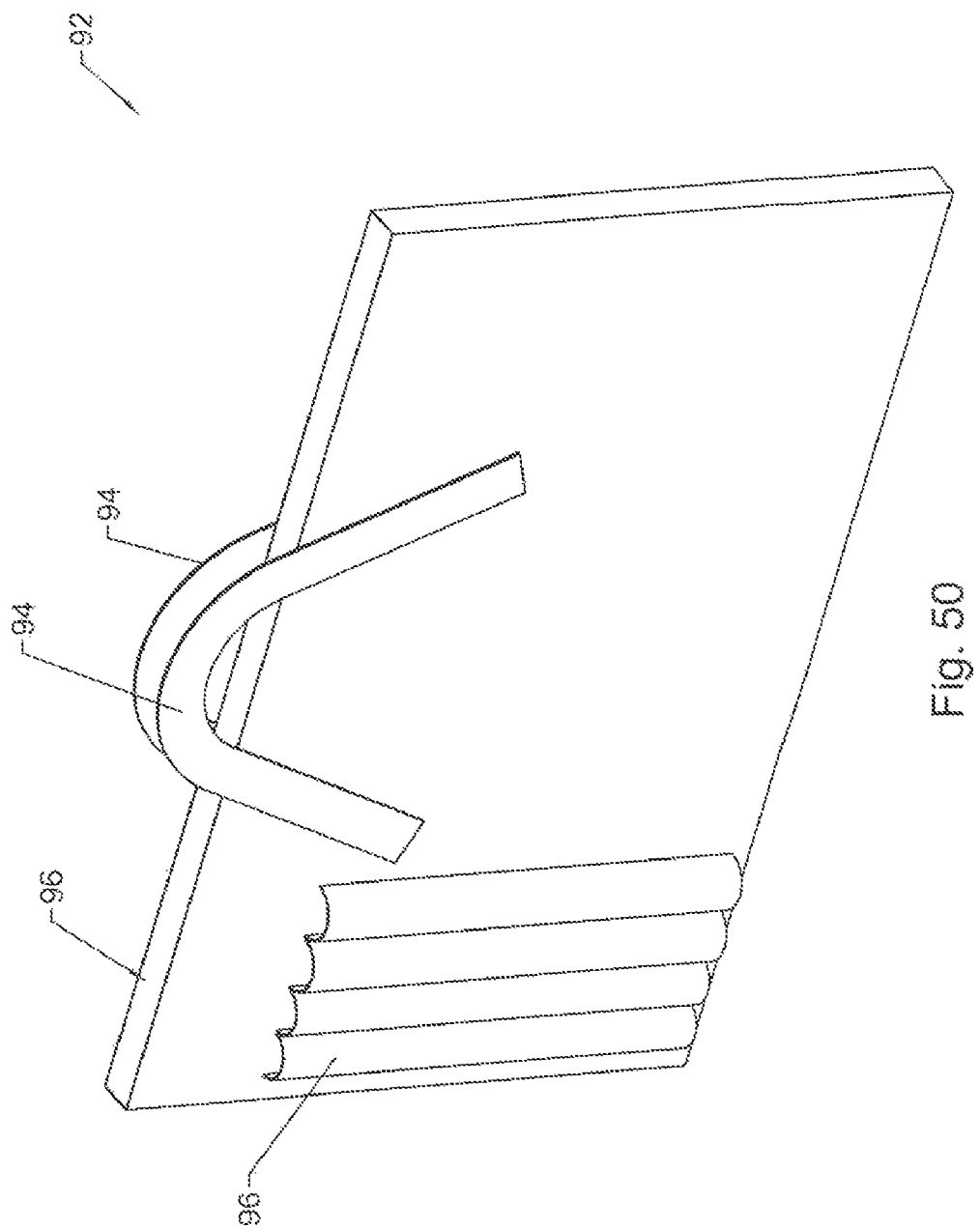
FIG. 50 is a perspective view of a carrying case of a display system according to the present invention.
Figure 51:
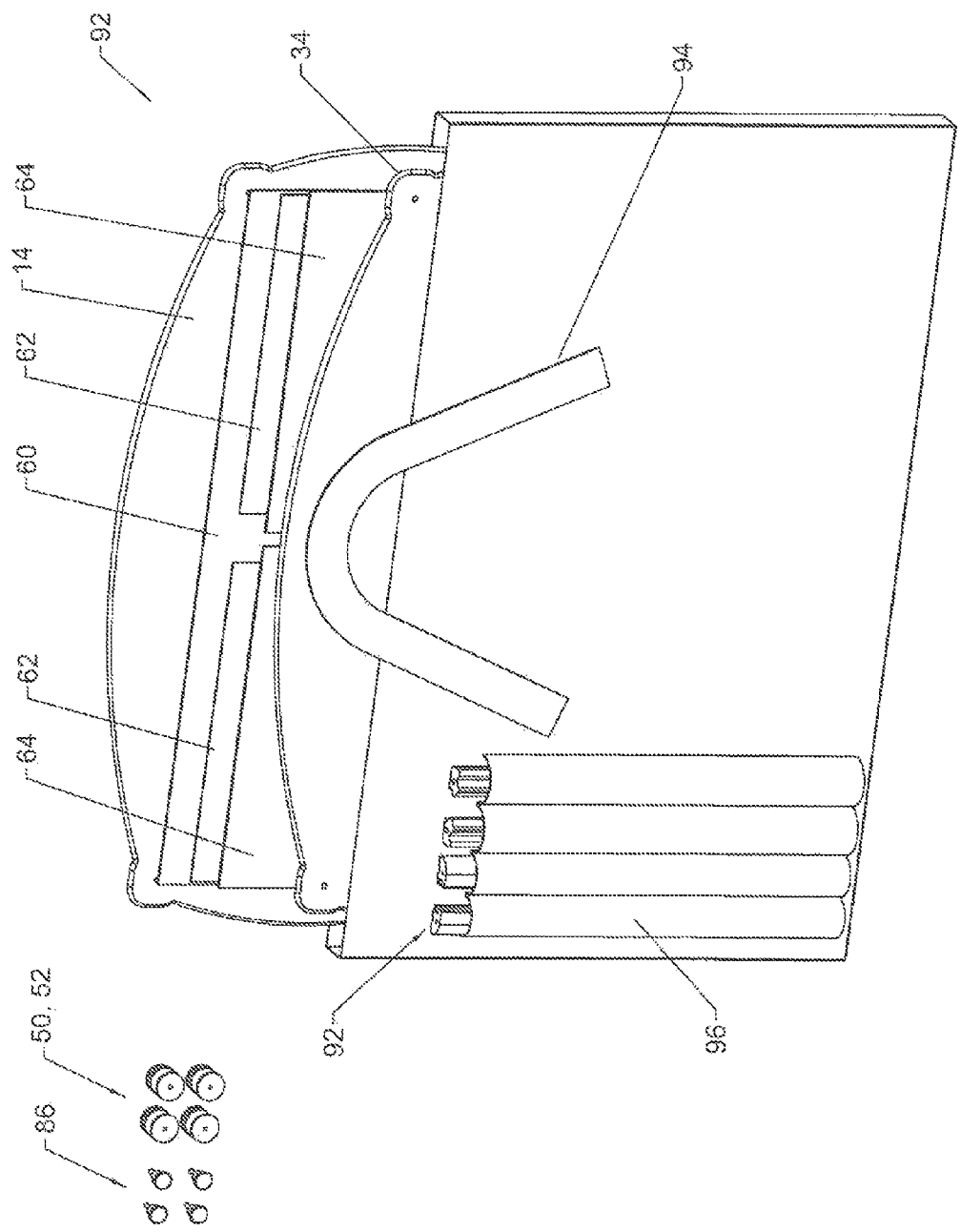
FIG. 51 is an environmental view of the carrying case illustrated in FIG. 50 and showing components of the display unit being carried therein.

Referring now additionally to FIGS. 50 and 51, a carrying case 92 of the display system 10 is described in greater detail. The carrying case 92 illustratively includes a pair of handles 94, and a plurality of compartments 96 shaped to accommodate the base 14, the posts 30, the top 34, the base fasteners 50 and the top fasteners 52. More specifically, the compartments 96 are adapted to receive all components of the display unit 12 so that a display unit may be carried in a substantially flat configuration. This advantageously allows a user to readily transport a display unit as necessary.

Figure 52:
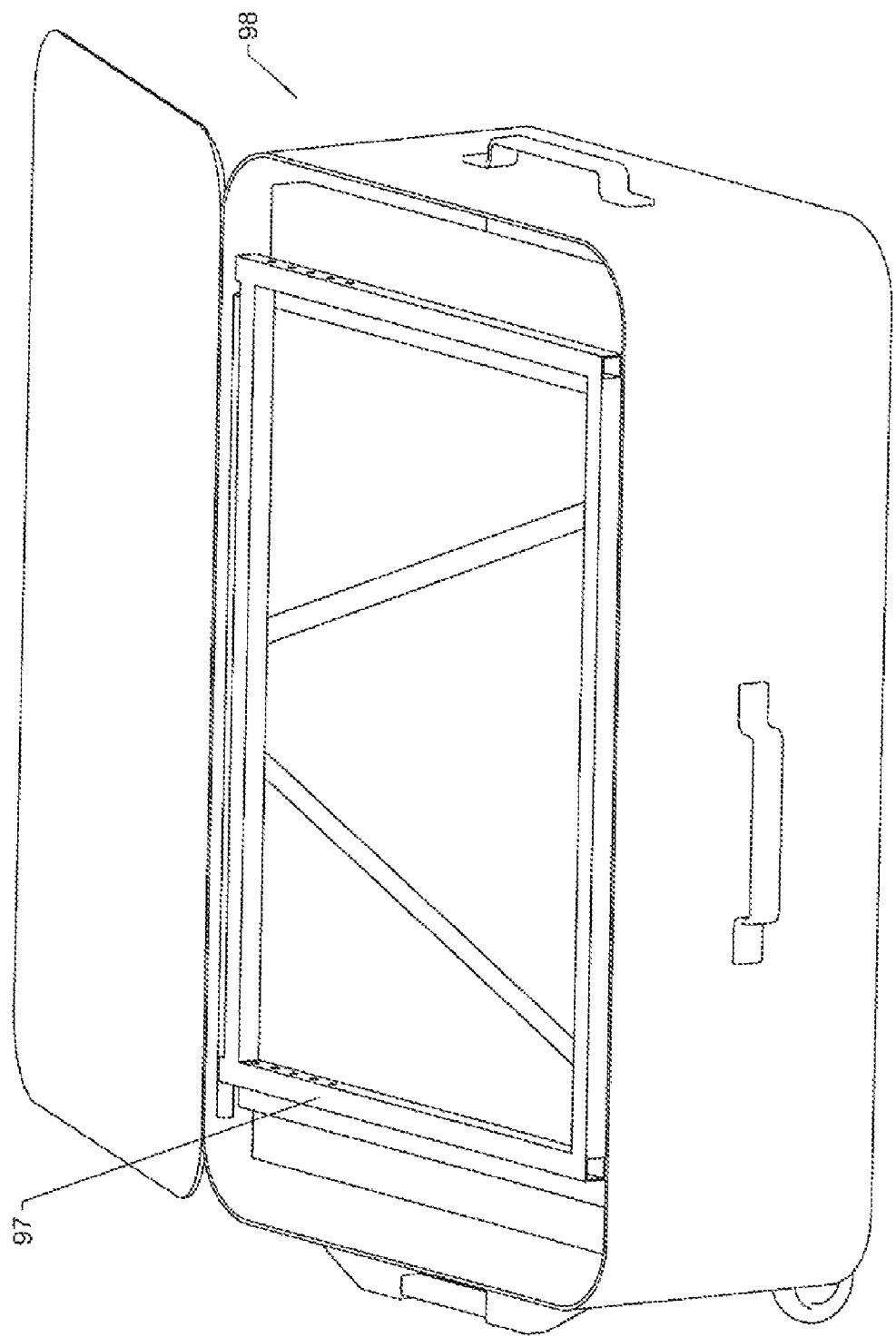
FIG. 52 is another embodiment of a carrying case of the display system according to the present invention.
Figure 53:
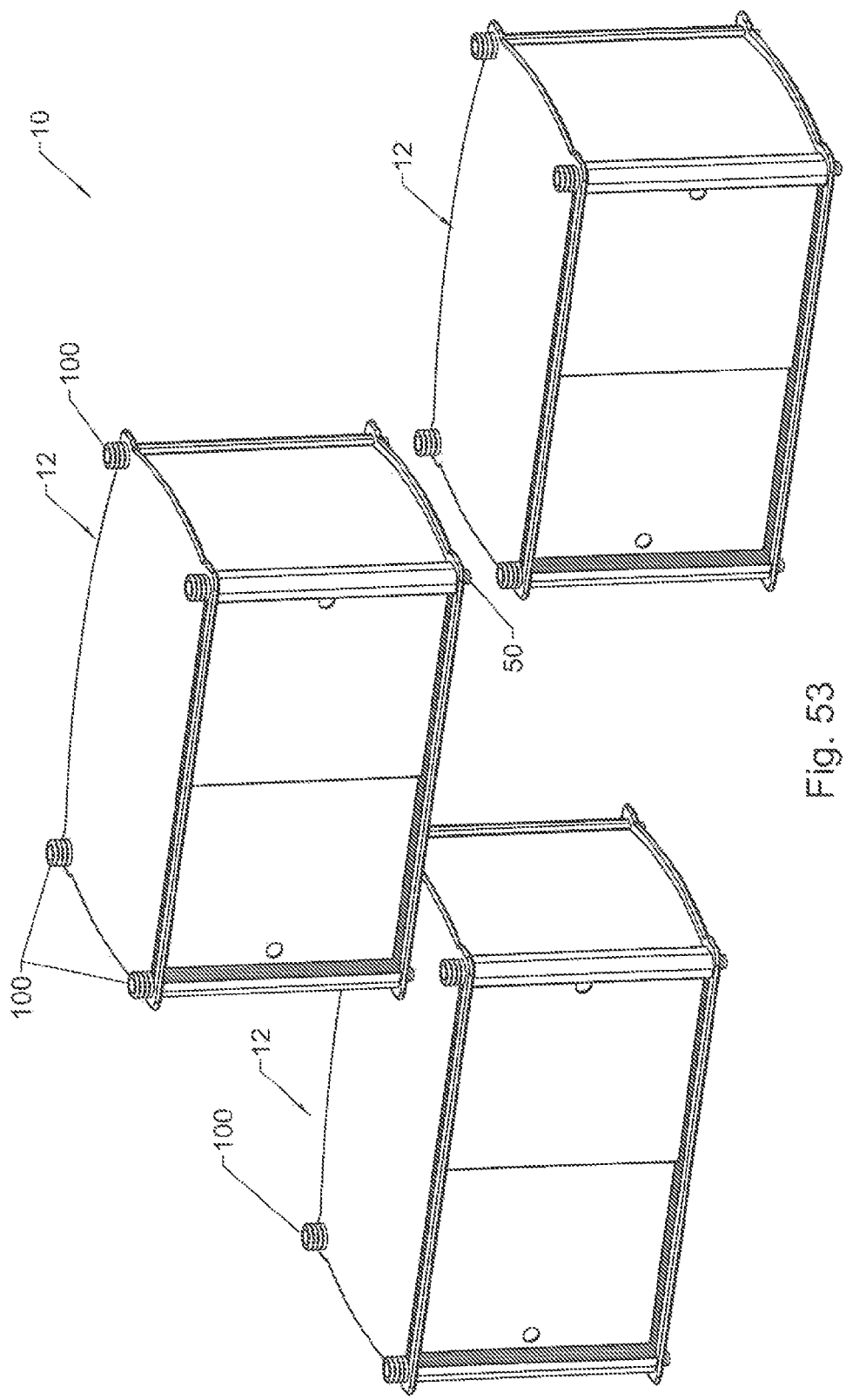
FIG. 53 is an exploded perspective view of a plurality of display units in a stacked configuration.
Figure 63:
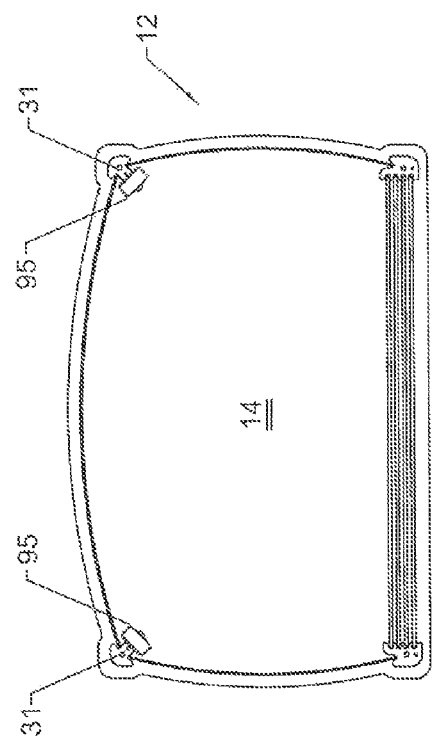
FIG. 63 is a top plan view of a display system including a light source carried by the posts.
Figure 64:
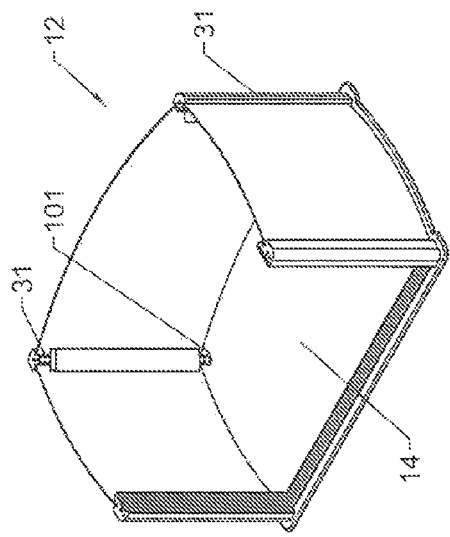
FIG. 64 is a partial perspective view of the display system illustrated in FIG. 63.
Figure 65:
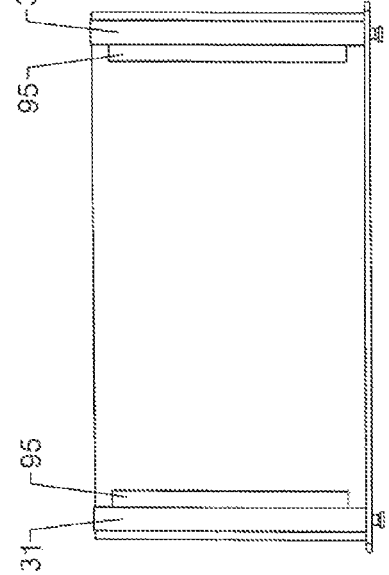
FIG. 65 is a rear elevation view of the display system illustrated in FIG. 64.
Figure 66:
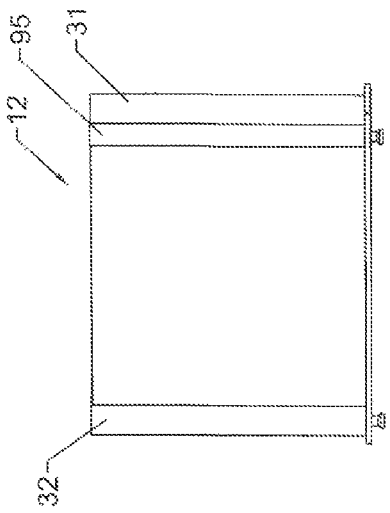
FIG. 66 is a side elevation view of the display system illustrated in FIG. 64.

An alternate embodiment of the carrying case 98 is illustrated in FIG. 52. This embodiment of the carrying case 98 preferably includes a deeper cavity to advantageously carry a plurality of display units 12'. The deeper cavity of this embodiment of the carrying case 98 also advantageously allows a user to carry a pedestal 97, or a plurality of pedestals. The pedestals 97 will be described in greater detail below. Those skilled in the art will also appreciate that the carrying case 98 of this embodiment may be suited to contain several of the carrying cases 92 illustrated in FIG. 51.

The base 14 and the top 34 are preferably made of a composite material, such as acrylonitrile butadiene styrene, i.e., ABS thermoplastic. The use of ABS thermoplastic is advantageous as it is a light, rigid and molded product. Those skilled in the art will appreciate that the base 14 and top 34 may be made of any other type of material, such as wood, for example. The front panel 60, the side panels 62 and the rear door panels 64 are preferably made of a strong, substantially transparent and pliable material such as, for example, acrylic glass or any other type of synthetic polymer that is plastic based.

The top 34 may also be made of a similar acrylic glass. As illustrated in the figures, the top door receiving recesses 48 formed in the top 34 may be alternatingly positioned. In other words, a pair of door receiving recesses 48 may be formed in a bottom portion 38 of the top 34 and another pair of top door receiving recesses may be formed in a top portion 36 of the top. The top door receiving recesses 48 are alternated so as to allow the top 34 to maintain a smaller thickness and provide enough space for each of the rear door panels 64 to engage the door receiving recesses. This is especially advantageous in the stacked configuration of the display system 10. Those skilled in the art will also appreciate that the front panel 60, the side panels 62, the rear door panels 64 and the top 34 may also be made of any other type of material that is substantially transparent to allow for items being displayed within the display unit 12 to be readily visible.

The side panels 62 on the configuration of the display unit 12 illustrated in FIGS. 45-49 are preferably made of substantially the same material as the base 14 and the top 34 of the display units illustrated, for example, in FIGS. 1 and 2. The posts 30 may be made of a wood material. The wood material is preferably poplar, and may be stained to achieve a desired color. Other wood materials that may be suitable for use as the posts 30 are various species of mahogany, such as sapele, for example. It is also contemplated that the posts 30 may also be made of an extruded aluminum material. Those skilled in the art will appreciate that the posts 30 may be made of any other type of material.

Referring now additionally to FIGS. 53-62, an additional aspect of the display system 10 is now described in greater detail. The display system 10 illustrated in FIGS. 53-62 includes a plurality of stackable display units 12. The stackable display units 12 are connected to one another using a configuration of a top fastener 100 that is perhaps best illustrated in FIGS. 59-62. More specifically, the top fasteners 100 are substantially cylindrical and include a recess formed in a top portion thereof. The recess is preferably shaped and sized to receive a standard base fastener 50.

As perhaps best illustrated in the detailed views of FIGS. 56A and 58A, the top fasteners 100 may be threadably connected to the posts 30. More specifically, the top fasteners 100 may include a threaded stem that extends outwardly therefrom, and adapted to be extended through the top 34 and into a threaded passageway in the posts 30. When threadably connected thereto, the top fasteners 100 are adapted to receive the base fasteners 50 of an upper one of the display units 12. This configuration advantageously decreases the time necessary to assemble the display system 10 and also advantageously eliminates the need for tools to assemble the display system.

Referring now additionally to FIGS. 63-66, additional features of the display system 10 are now described in greater detail. The display system 10 may include a light source 95 carried by the front posts 31 of the display unit 12. The light source 95 may, for example, be a light bar that is fastened to an interior portion of the front post 31 to advantageously provide illumination within the display unit 12 while not interfering with the view of products being displayed within the display unit. A passageway 96 may be formed in the base 14 to allow a power supply cable (not shown) to extend therethrough. Those skilled in the art will appreciate that the power supply cable may be used to provide AC power to the lights, but battery power is also contemplated by the present invention. The light source 95 may, for example, be provided by a light emitting diode, or any other type of light source as understood by those skilled in the art.

Figure 67:
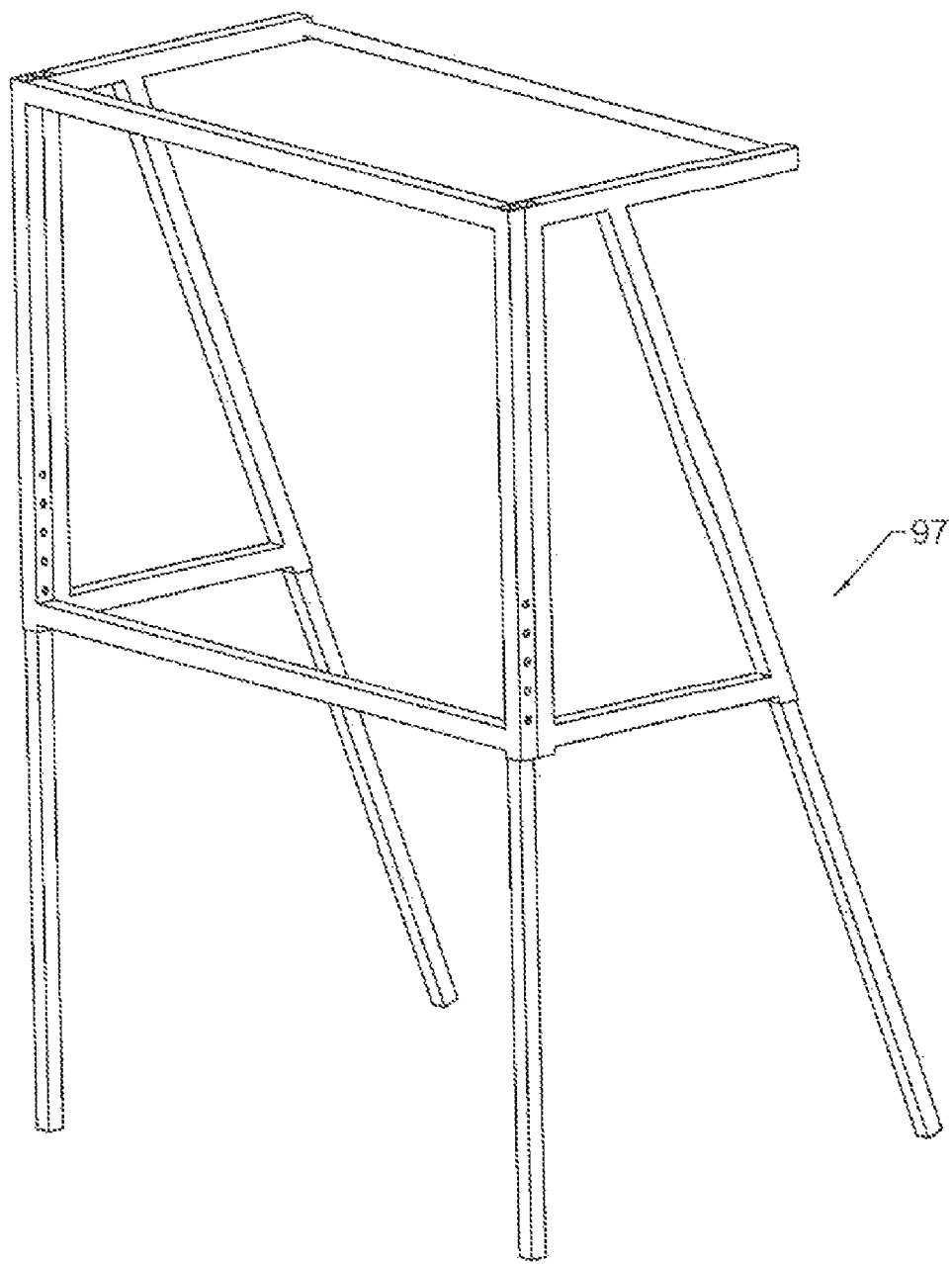
FIG. 67 is a perspective view of a pedestal stand used to support the display unit according to the present invention.
Figure 68:
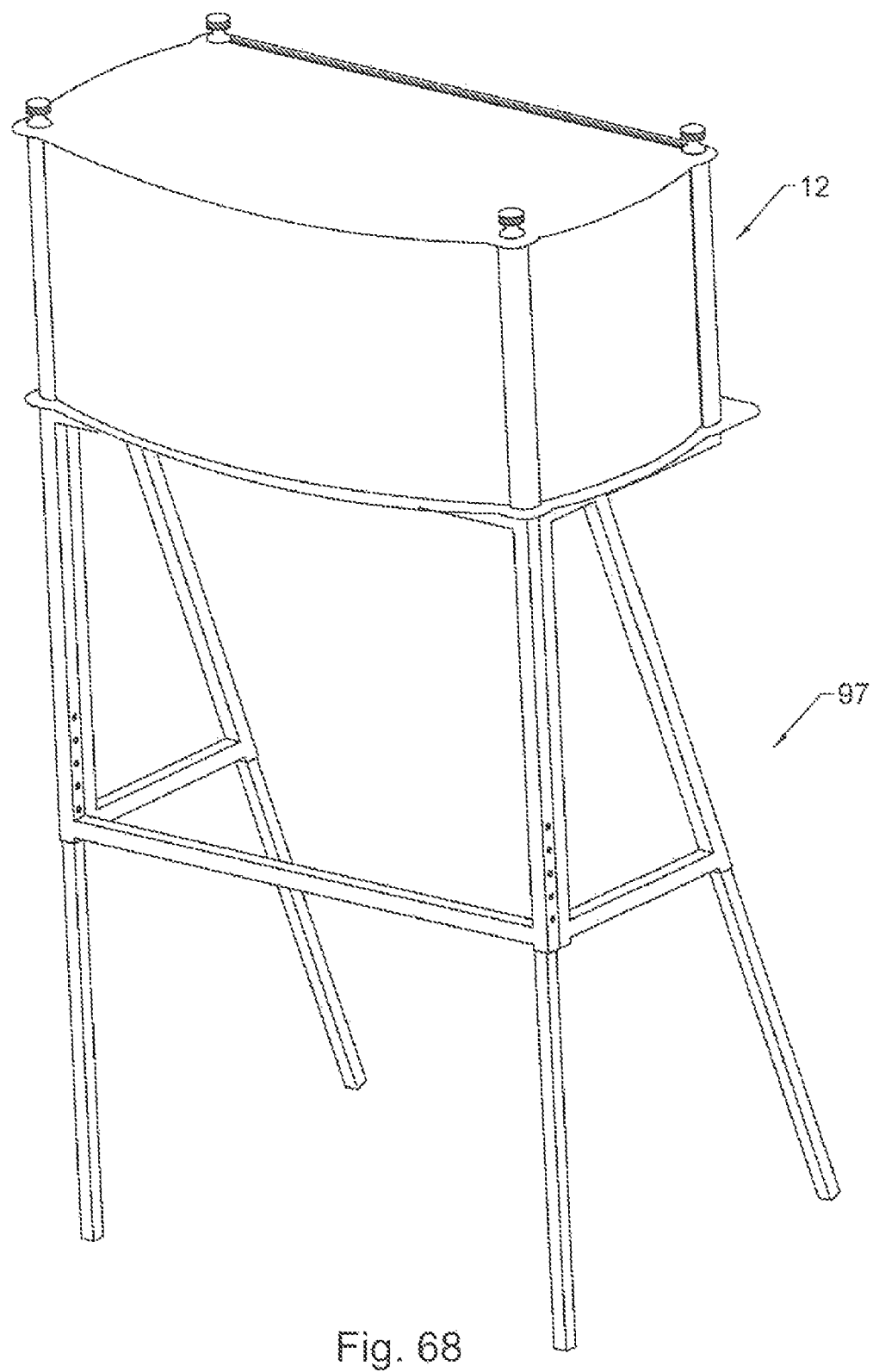
FIG. 68 is a perspective view of the pedestal stand illustrated in FIG. 67 and showing a display unit positioned thereon.

Referring now additionally to FIGS. 67 and 68, a pedestal 97 that may be used to support the display unit 12 is now described in greater detail. As illustrated, the pedestal 97 may advantageously have an adjustable height. More specifically, the pedestal 97 may have lower leg portions and an upper support structure. The lower leg portions may engage lower portions of the upper support structure. In fact, the lower leg portions may slidably engage the lower portions of the upper support structure. Both the upper support structure and the lower leg members may have a plurality of passageways formed therein. A pin member may be used to engage the passageways to fix the height of the pedestal 97.

The display unit 12 may be positioned on a top portion of the support structure. More specifically, the base fasteners 50 may be positioned to engage passageways formed in an upper portion of the upper support structure. Therefore, when the display unit 12 is positioned to overlie the pedestal 97, the connection between the base fasteners 50 and the passageways formed in the upper portion of the upper support structure advantageously provides enhanced stability.

The pedestal 97 is advantageously collapsible. More specifically, side portions of the upper support structure may be hingedly connected to a front portion thereof. Further, the lower leg portions of the pedestal 97 are preferably provided by individual pieces. When not in use, the side portions of the upper support structure may be folded inwardly towards the front portion so as to allow the upper support structure to be configured flat. This advantageously allows the pedestal 97 to be carried in the carrying case 98, if so desired.

A method aspect of the present invention is for assembling a display unit 12 of a portable display system 10. The method may include extending a plurality of base fasteners 50 through passageways 26 formed in the base 14 to engage the engagement member passageways 33 on a bottom portion of the posts 30 to fasten the plurality of posts to the base. The method may also include extending a plurality of top fasteners 52 through passageways 46 formed in the top 34 to engage the engagement member passageways 33 on an upper portion of the posts 30 to fasten the plurality of posts to the top. The method further includes engaging a front panel 50 and a pair of opposing side panels 62 with panel receiving recesses 56, 58 formed in the plurality of posts 30. The method may still further include slidably engaging a pair of rear panels 64 with the top door receiving recesses 48, and base door receiving recesses 28 formed respectively in the top 34 and the base 14 so that the rear panels laterally slide with respect to the top and the base and engage the post door receiving recesses 54 formed in the plurality of posts 30.

Many modifications and other embodiments of the invention will come to the mind of one skilled in the art having the benefit of the teachings presented in the foregoing descriptions and the associated drawings. Therefore, it is understood that the invention is not to be limited to the specific embodi- That which is claimed is:

1. A display unit for a portable display system, the display unit comprising:
   a base having a top, a bottom, a rear, sides extending outwardly from the rear, a curved front opposite the rear, and a plurality of passageways formed therein;
   a plurality of posts to engage the base to extend upwardly therefrom, each of the plurality of posts including threaded engagement member receiving recesses formed in end portions thereof;
   a top to engage the plurality of posts and having a top, a bottom, a rear, sides extending outwardly from the rear, a curved front, and a plurality of passageways formed therein;
   a plurality of base fasteners to extend through the passageways formed in the base to fasten the plurality of posts to the base;
   a plurality of top fasteners to extend through the passageways formed in the top to fasten the plurality of posts to the top;
   a front panel, side panels, and at least one pair of rear panels;
   wherein the curve of the front of the base is defined by a radius;
   wherein the curve of the front of the top is defined by a radius;
   wherein each of the plurality of posts includes at least one panel receiving recess formed therein for receiving side portions of each of the front panel, side panels and rear panels;
   wherein the top, the plurality of posts and the base, when assembled, define a first opening adjacent a front portion thereof, a second opening adjacent a rear portion thereof and side openings adjacent opposing side portions thereof;
   wherein a lateral dimension of the first opening is smaller than a lateral dimension of the front panel;
   wherein the front panel is curved when positioned within the first opening to engage the at least one panel receiving recess formed on the plurality of posts;
   wherein the curve of the front panel is defined by a radius and wherein the radii of the curve of the front panel, the curve of the front of the top and the curve of the front of the base are substantially similar;
   wherein each of the plurality of top fasteners includes a fastener top, a locking member and a post engagement member to be threadably connected to the engagement member receiving recess; and
   wherein the post engagement member includes a threaded bottom portion and a j-shaped recess formed adjacent an upper portion thereof adapted to receive the locking member.

2. A display unit according to claim 1 wherein the top includes a locator recess formed adjacent the passageways, and wherein a locator member is carried by an upper portion of each of the plurality of posts to engage the locator recess.

3. A display unit according to claim 1 wherein the rear panels slidably engage door receiving recesses formed in the top of the base; and wherein the rear panels each include at least one lock receiving passageway for receiving a lock that prevents the rear panels from slidably moving along the door receiving recesses.

4. A display unit according to claim 1 further comprising a carrying case; and wherein the carrying case includes a plurality of compartments shaped to accommodate the base, the plurality of posts, the top, the front panel, side panels, the at least one pair of rear panels and the plurality of top and bottom fasteners; and wherein the front panel, side panels and rear panels are configured in to be flat when carried by the carrying case.

5. A display unit for a portable display system, the display unit comprising:
   a base having a top, a bottom, a rear, sides extending outwardly from the rear, a curved front opposite the rear, and a plurality of passageways formed therein;
   a plurality of posts to engage the base to extend upwardly therefrom, each of the plurality of posts including threaded engagement member receiving recesses formed in end portions thereof;
   a top to engage the plurality of posts and having a top, a bottom, a rear, sides extending outwardly from the rear, a curved front, and a plurality of passageways formed therein;
   a plurality of base fasteners to extend through the passageways formed in the base to fasten the plurality of posts to the base;
   a plurality of top fasteners to extend through the passageways formed in the top to fasten the plurality of posts to the top;
   a front panel, side panels, and at least one pair of rear panels;
   wherein the curve of the front of the base is defined by a radius;
   wherein the curve of the front of the top is defined by a radius;
   wherein each of the plurality of posts includes at least one panel receiving recess formed therein for receiving side portions of each of the front panel, side panels and rear panels;
   wherein the top, the plurality of posts and the base, when assembled, define a first opening adjacent a front portion thereof, a second opening adjacent a rear portion thereof and side openings adjacent opposing side portions thereof;
   wherein a lateral dimension of the first opening is smaller than a lateral dimension of the front panel;
   wherein the front panel is curved when positioned within the first opening to engage the at least one panel receiving recess formed on the plurality of posts;
   wherein the curve of the front panel is defined by a radius and wherein the radii of the curve of the front panel, the curve of the front of the top and the curve of the front of the base are substantially similar;
   wherein each of the plurality of top fasteners includes a fastener top, a locking member and a post engagement member to be threadably connected to the engagement member receiving recess; and
   wherein an upper portion of the post engagement member comprises a recessed portion extending substantially the entire circumference thereof, and wherein the locking member is spring loaded to engage the recessed portion.

6. A display unit according to claim 5 wherein the top of the display unit includes a locator recess formed adjacent the passageways, and wherein a locator member is carried by an upper portion of each of the plurality of posts to engage the locator recess.

7. A display unit according to claim 5 wherein the rear panels slidably engage door receiving recesses formed in the top of the base; and wherein the rear panels each include at least one lock receiving passageway for receiving a lock that prevents the rear panels from slidably moving along the door receiving recesses.

8. A display unit according to claim 5 further comprising a carrying case; and wherein the carrying case includes a plurality of compartments shaped to accommodate the base, the plurality of posts, the top, the front panel, side panels, the at least one pair of rear panels and the plurality of top and bottom fasteners; and wherein the front panel, side panels and rear panels are configured to be flat when carried by the carrying case.

* * * * *